(12) United States Patent
Hase et al.

(10) Patent No.: US 12,104,819 B2
(45) Date of Patent: Oct. 1, 2024

(54) AIR-CONDITIONING UNIT, HEAT EXCHANGER, AND AIR CONDITIONER

(71) Applicant: MITSUBISHI HEAVY INDUSTRIES THERMAL SYSTEMS, LTD., Tokyo (JP)

(72) Inventors: Tomoki Hase, Tokyo (JP); Hideaki Tatenoi, Tokyo (JP); Nobuya Nakagawa, Tokyo (JP); Yasuo Katayama, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 372 days.

(21) Appl. No.: 17/624,165

(22) PCT Filed: Jun. 26, 2020

(86) PCT No.: PCT/JP2020/025205
§ 371 (c)(1),
(2) Date: Dec. 30, 2021

(87) PCT Pub. No.: WO2021/002288
PCT Pub. Date: Jan. 7, 2021

(65) Prior Publication Data
US 2022/0364762 A1 Nov. 17, 2022

(30) Foreign Application Priority Data
Jul. 1, 2019 (JP) .................................. 2019-122641

(51) Int. Cl.
*F24F 13/08* (2006.01)
*F28D 1/00* (2006.01)
(Continued)

(52) U.S. Cl.
CPC ............ *F24F 13/08* (2013.01); *F28D 1/0417* (2013.01); *F28D 1/05366* (2013.01)

(58) Field of Classification Search
CPC . F24F 13/08; B60H 1/00328; B60H 1/32284; F28D 1/0417; F28D 1/05366;
(Continued)

(56) References Cited

U.S. PATENT DOCUMENTS 5,896,921 A * 4/1999 Lee ...................... F28D 1/0477
165/145
6,360,817 B1 * 3/2002 Brochin ................ F28D 1/0417
165/77
(Continued)

FOREIGN PATENT DOCUMENTS

DE 42 27 565 C1 11/1993
JP 61-63567 U 4/1986
(Continued)

OTHER PUBLICATIONS

International Preliminary Report on Patentability and Written Opinion of the International Searching Authority for International Application No. PCT/2020/025205, dated Jan. 13, 2022 with English translation.
Extended European Search Report for European Application No. 20834952.2, dated Jun. 22, 2023.

*Primary Examiner* — Marc E Norman
(74) *Attorney, Agent, or Firm* — Birch, Stewart, Kolasch & Birch, LLP

(57) ABSTRACT

This air-conditioning unit includes a heat exchanger that exchanges heat between air and a coolant, a blower, and an air outflow part. The heat exchanger includes a plurality of tubes in which the coolant flows, an inlet header, an outlet header, and a fin. The inlet header includes: a low-temperature-side coolant inflow part into which coolant that has a relatively low temperature can flow; and a high-temperature-
(Continued)

side coolant inflow part into which coolant that has a relatively high temperature can flow. The low-temperature-side coolant inflow part and the high-temperature-side coolant inflow part are offset from each other in the direction of the flow of air that passes through the heat exchanger and in an intersecting direction that intersects the direction of the flow of air.

20 Claims, 9 Drawing Sheets

(51) Int. Cl.
*F28D 1/04* (2006.01)
*F28D 1/053* (2006.01)

(58) Field of Classification Search
CPC .............. F28D 1/024; F28D 2001/0273; F28F 2210/10
See application file for complete search history.

(56) References Cited

U.S. PATENT DOCUMENTS

| | | |
|---|---|---|
| 2003/0234098 A1 | 12/2003 | Huang et al. |
| 2016/0288618 A1 | 10/2016 | Katoh et al. |
| 2018/0312035 A1* | 11/2018 | Koberstein ........ B60H 1/00899 |

FOREIGN PATENT DOCUMENTS

| | | |
|---|---|---|
| JP | 10-266855 A | 10/1998 |
| JP | 2005-82079 A | 3/2005 |
| JP | 2006-143081 A | 6/2006 |
| JP | 2010-111269 A | 5/2010 |
| JP | 2015-16706 A | 1/2015 |
| JP | 2016-175627 A | 10/2016 |
| JP | 61-97642 B2 | 9/2017 |
| JP | 2018-036040 A | 3/2018 |
| WO | WO 2018/002111 A1 | 1/2016 |

* cited by examiner

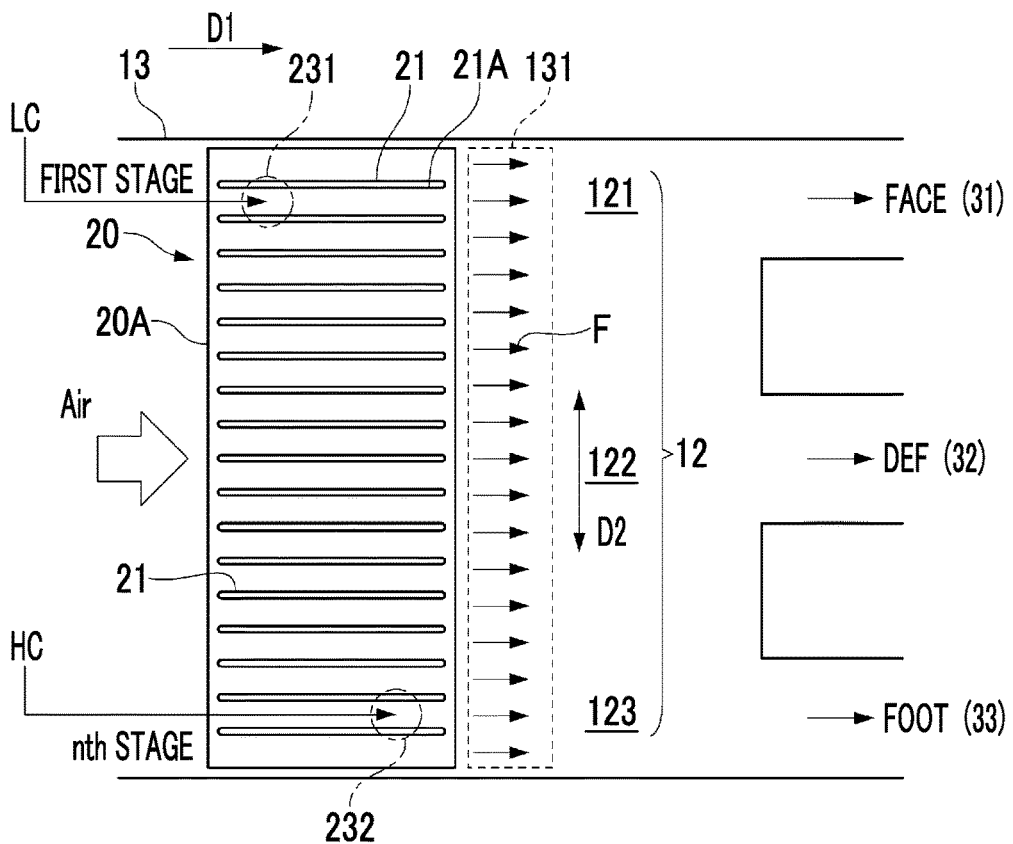
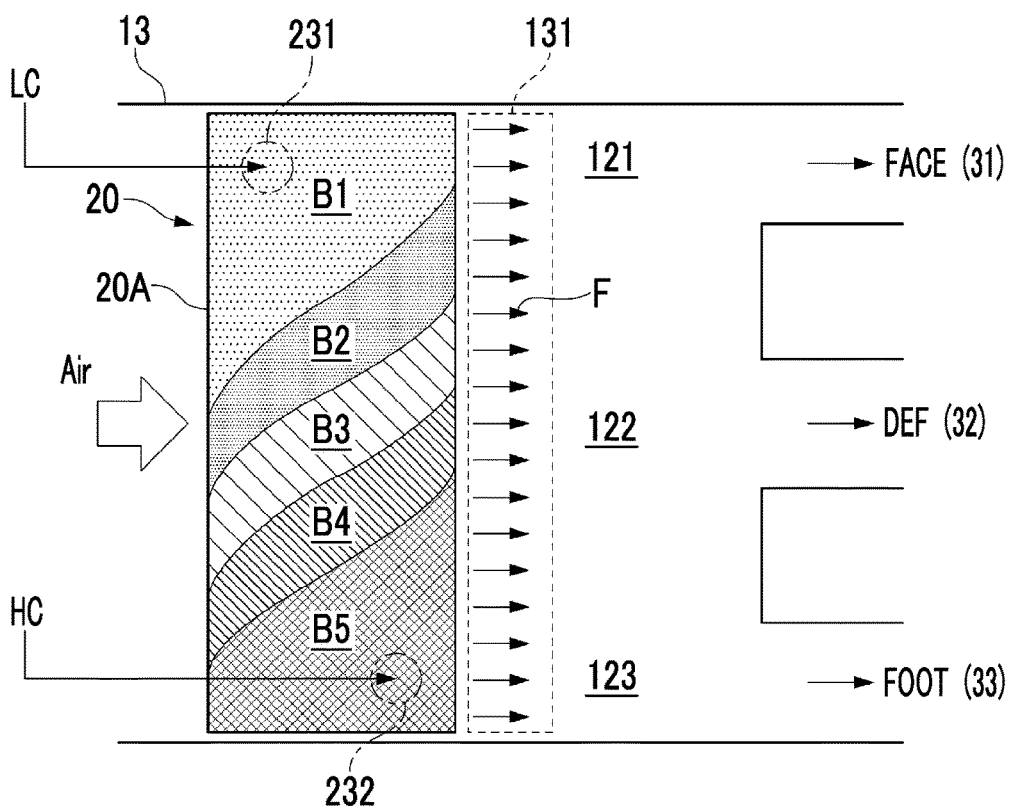

PURE COOLING MODE

MILD COOLING MODE

MILD HEATING AND DEHUMIDIFIED HEATING MODE

PURE HEATING MODE

AIR-CONDITIONING UNIT, HEAT EXCHANGER, AND AIR CONDITIONER

TECHNICAL FIELD

The present invention relates to an air conditioning unit, a heat exchanger, and an air conditioner.

BACKGROUND ART

An air conditioner mounted on a vehicle is configured to include an air conditioning unit which is called a heating, ventilating, and air conditioning (HVAC) provided in a vehicle interior.

For example, as described in PTL 1, the HVAC includes a blower that sucks outside air or inside air and blows the air from an air blowing port through a duct, a first heat exchanger (evaporator) to which a refrigerant is supplied from a refrigerant system, and a second heat exchanger (heater core) to which engine cooling water, which is warm water, is supplied from a coolant system as a heat source. The evaporator cools and dehumidifies the air by causing the refrigerant and the air to exchange heat with each other. The heater core heats the air by causing the warm water and the air to exchange heat with each other. The HVAC performs temperature regulation by mixing air which has passed through the heat exchangers, and blows the air from each of air blowing ports for defrost, a face, and a foot.

A flow channel for flowing air which has passed through the evaporator into the heater core is set in the duct of the HVAC, and the flow rate of the air flowing in the flow channel is regulated by regulating an opening degree of an air mix damper disposed between the evaporator and the heater core. Air which has passed through only the evaporator and has a relatively low temperature and air which has passed through the evaporator and the heater core and has a relatively high temperature are mixed in a predetermined region in the duct, and is distributed to each blowing port.

CITATION LIST

Patent Literature

[PTL 1] Japanese Unexamined Patent Application Publication No. 2006-143081

SUMMARY OF INVENTION

Technical Problem

In a case where two heat exchangers are included as in the HVAC unit described in PTL 1, as shown in FIG. 9, a space for providing an air mix damper 93 and a region 94 which is downstream of an evaporator 91 and a heater core 92 and in which air is mixed are necessary inside the unit.

Herein, since it is necessary to introduce air from the mixing region 94 positioned in the vicinity of a trailing end of the duct toward each of the blowing ports for a face (FACE), defrost (DEF), and a foot (FOOT), it is difficult to supply air having an appropriate temperature to each blowing port in some cases. When the mixing region cannot be widely secured, it is difficult to appropriately set a flow channel in which air in a different temperature range flows from the mixing region 94 toward each blowing port.

An object of the present invention is to provide a heat exchanger that can realize supply of air having an appropriate temperature to a plurality of blowing ports in an air conditioning unit such as an HVAC unit, and an air conditioning unit including the heat exchanger, and an air conditioner.

Solution to Problem

According to an aspect of the present invention, there is provided an air conditioning unit including a heat exchanger that causes air and a coolant to exchange heat with each other, a blower that supplies the air to the heat exchanger, and an air outflow portion through which the air, which has passed through the heat exchanger, flows out from the air conditioning unit. The heat exchanger includes a plurality of stacked tubes each of which allows the coolant to flow therein, an inlet header that communicates with end portions of the plurality of tubes on an upstream side in a direction in which the coolant flows, an outlet header that communicates with end portions of the plurality of tubes on a downstream side in the direction in which the coolant flows, and a fin that is thermally coupled to the plurality of tubes.

In the present invention, the inlet header includes a low-temperature-side coolant inflow portion into which the coolant having a relatively low temperature is able to flow and a high-temperature-side coolant inflow portion into which the coolant having a relatively high temperature is able to flow, and the low-temperature-side coolant inflow portion and the high-temperature-side coolant inflow portion are shifted from each other in a direction of flow of the air passing through the heat exchanger and are shifted from each other in an intersecting direction intersecting the direction of flow of the air.

In the air conditioning unit of the present invention, it is preferable that the low-temperature-side coolant inflow portion is shifted to an upstream side of flow of the air with respect to the high-temperature-side coolant inflow portion.

In the air conditioning unit of the present invention, it is preferable that the air outflow portion includes a low-temperature-side air outflow portion through which the air having a relatively low temperature flows out and a high-temperature-side air outflow portion through which the air having a relatively high temperature flows out.

In the air conditioning unit of the present invention, it is preferable that the air conditioning unit is used in air conditioning of an interior of a vehicle, the air outflow portion includes the low-temperature-side air outflow portion, the high-temperature-side air outflow portion, and a medium temperature air outflow portion through which the air having a relatively medium temperature flows out, the low-temperature-side air outflow portion, the medium temperature air outflow portion, and the high-temperature-side air outflow portion are shifted from each other in the intersecting direction, the low-temperature-side air outflow portion corresponds to an air blowing port for a face, the medium temperature air outflow portion corresponds to an air blowing port for a window, and the high-temperature-side air outflow portion corresponds to an air blowing port for feet.

In the air conditioning unit of the present invention, it is preferable that the heat exchanger has a curved shape in which a part is positioned relatively on an upstream side in the direction of flow of the air and the other part is positioned relatively on a downstream side.

In the air conditioning unit of the present invention, it is preferable that the inlet header and the outlet header communicate with a plurality of rows of the tubes arranged in the direction of flow of the air, an inside of the inlet header is divided into a low-temperature-side section into which the coolant is able to flow from the low-temperature-side coolant inflow portion and a high-temperature-side section into which the coolant is able to flow from the high-temperature-side coolant inflow portion, the low-temperature-side section communicates with the tubes in a row on an upstream side or a downstream side in the direction of flow of the air, the high-temperature-side section communicates with the tubes in the other row, and a movement of the coolant between the low-temperature-side section and the high-temperature-side section is allowed.

In addition, according to another aspect of the present invention, there is provided a heat exchanger that causes air and a coolant to exchange heat with each other, the heat exchanger including a plurality of stacked tubes each of which allows the coolant to flow therein, an inlet header that communicates with end portions of the plurality of tubes on an upstream side in a direction in which the coolant flows, an outlet header that communicates with end portions of the plurality of tubes on a downstream side in the direction in which the coolant flows, and a fin that is thermally coupled to the plurality of tubes. The inlet header includes a low-temperature-side coolant inflow portion into which the coolant having a relatively low temperature flows and a high-temperature-side coolant inflow portion into which the coolant having a relatively high temperature flows. The low-temperature-side coolant inflow portion and the high-temperature-side coolant inflow portion are shifted from each other in a direction of flow of the air passing through the heat exchanger and are shifted from each other in an intersecting direction intersecting the direction of flow of the air.

According to still another aspect of the present invention, there is provided an air conditioner including a refrigerant circuit that includes a compressor, a condenser, a decompression unit, and an evaporator, a high-temperature-side coolant circuit that includes a high-temperature-side heat exchanger which causes a coolant and a refrigerant flowing in the condenser to exchange heat with each other, a low-temperature-side coolant circuit that includes a low-temperature-side heat exchanger which causes the coolant and a refrigerant flowing in the evaporator to exchange heat with each other, a first heat exchanger to which the coolant is supplied from at least one of the high-temperature-side coolant circuit and the low-temperature-side coolant circuit, and a second heat exchanger to which the coolant is supplied from at least one of the high-temperature-side coolant circuit and the low-temperature-side coolant circuit. The first heat exchanger is the heat exchanger of the air conditioning unit described above. The coolant is able to flow from the low-temperature-side coolant circuit into the low-temperature-side coolant inflow portion. The coolant is able to flow from the high-temperature-side coolant circuit into the high-temperature-side coolant inflow portion.

It is preferable that the air conditioner of the present invention is used in air conditioning of an interior of a vehicle, and the air outflow portion of the air conditioning unit corresponds to a blowing port through which the air is blown to the interior.

Advantageous Effects of Invention

In the present invention, as the low-temperature-side coolant inflow portion and the high-temperature-side coolant inflow portion, into which the coolants having relatively different temperatures flow respectively, are included in the inlet header of the heat exchanger and the coolant inflow portions are shifted from each other in the direction of flow of the air, the coolant which has flowed into the inlet header from each of the low-temperature-side coolant inflow portion and the high-temperature-side coolant inflow portion flows unevenly into a close tube from the inflow portion that the coolant has flowed in.

For this reason, since a temperature gradient in a tube stage direction is given to the coolant flowing in each tube, the same temperature gradient is given also to the air that gives and receives heat to and from the coolant which is supplied to the heat exchanger and flows in each of the tubes.

Then, air in a temperature range suitable for each supply destination can be easily and reliably distributed to a plurality of supply destinations, to which temperature-controlled air is to be supplied, from a region adjacent to a downstream side of the heat exchanger by causing air having an appropriate temperature to flow out through the air outflow portion which can be selected for an appropriate position.

BRIEF DESCRIPTION OF DRAWINGS

FIG. 3A is a view that shows a simplified shape of the heat exchanger shown in FIG. 2 and schematically shows correspondence between flow of air, which has passed through the heat exchanger and flows out from the air conditioning unit, and an air blowing port in a vehicle interior. FIG. 3B is a schematic view showing an example of a temperature gradient given to the heat exchanger based on positions of a low-temperature-side coolant inflow portion and a high-temperature-side coolant inflow portion for flowing into an inlet header of the heat exchanger.

FIG. 5A shows a pure cooling mode, and FIG. 5B shows a mild cooling mode.

FIG. 6A shows a mild heating and dehumidified heating mode, and FIG. 6B shows a pure heating mode.

FIG. 7A is a perspective view showing the heat exchanger from the upwind side, and FIG. 7B is a plan view showing the heat exchanger from above.

FIG. 8 shows an example of a temperature gradient given to the heat exchanger by an isotherm.

DESCRIPTION OF EMBODIMENTS

Hereinafter, embodiments according to the present invention will be described with reference to the drawings.

First Embodiment

An air conditioning unit 10 and a heat exchanger 20 configuring the air conditioning unit 10 will be described with reference to FIGS. 1 to 6. The air conditioning unit 10 and the heat exchanger 20 can be used, for example, in air conditioning of the interior of a vehicle as will be described below. An air conditioner 1 (FIG. 4) including the air conditioning unit 10 is mounted on, for example, the vehicle. The air conditioning unit 10 is provided in a vehicle interior In (FIG. 4).

Figure 1:
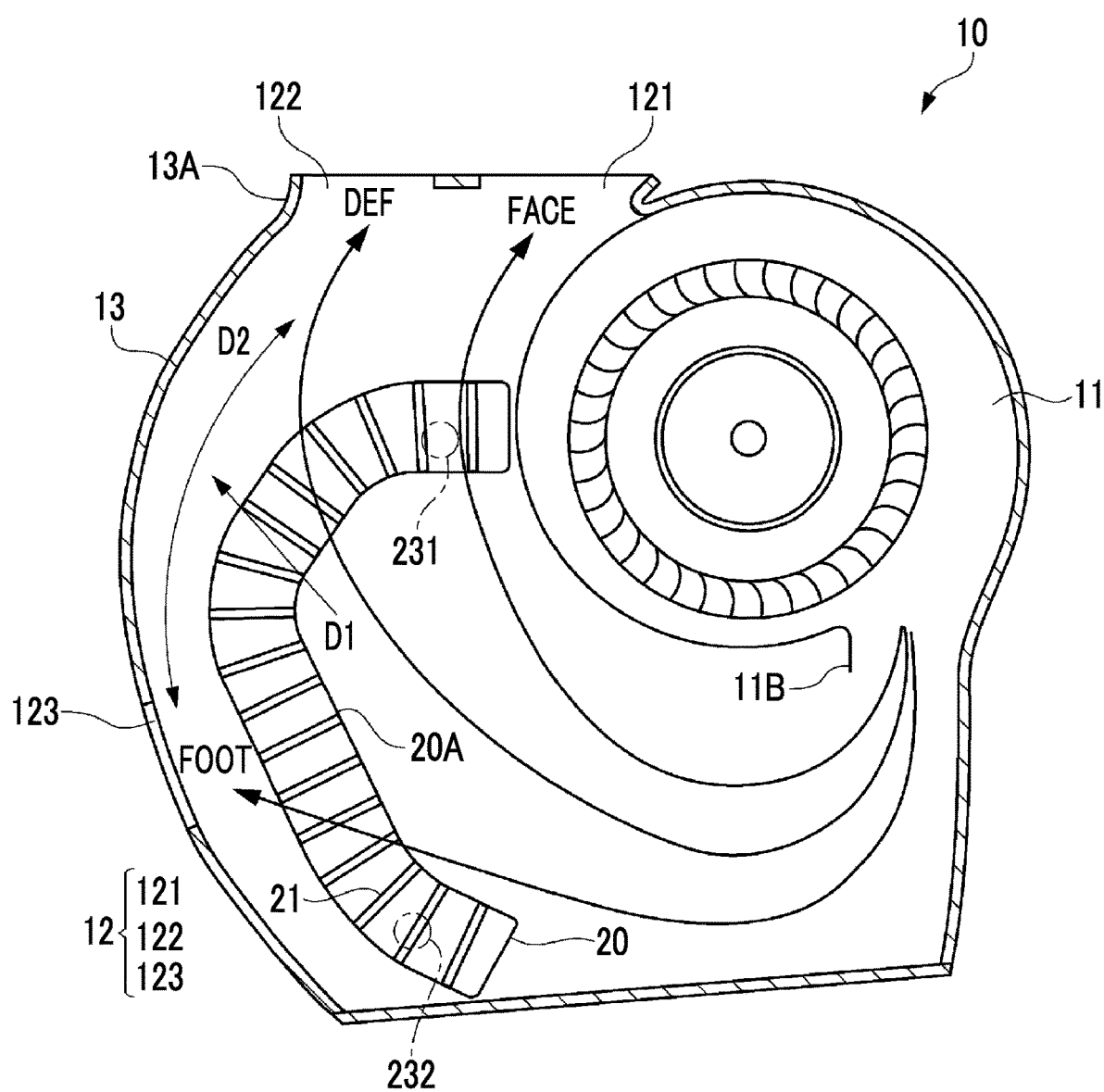
FIG. 1 is a view showing an inside of an air conditioning unit according to a first embodiment of the present invention.
Figure 4:
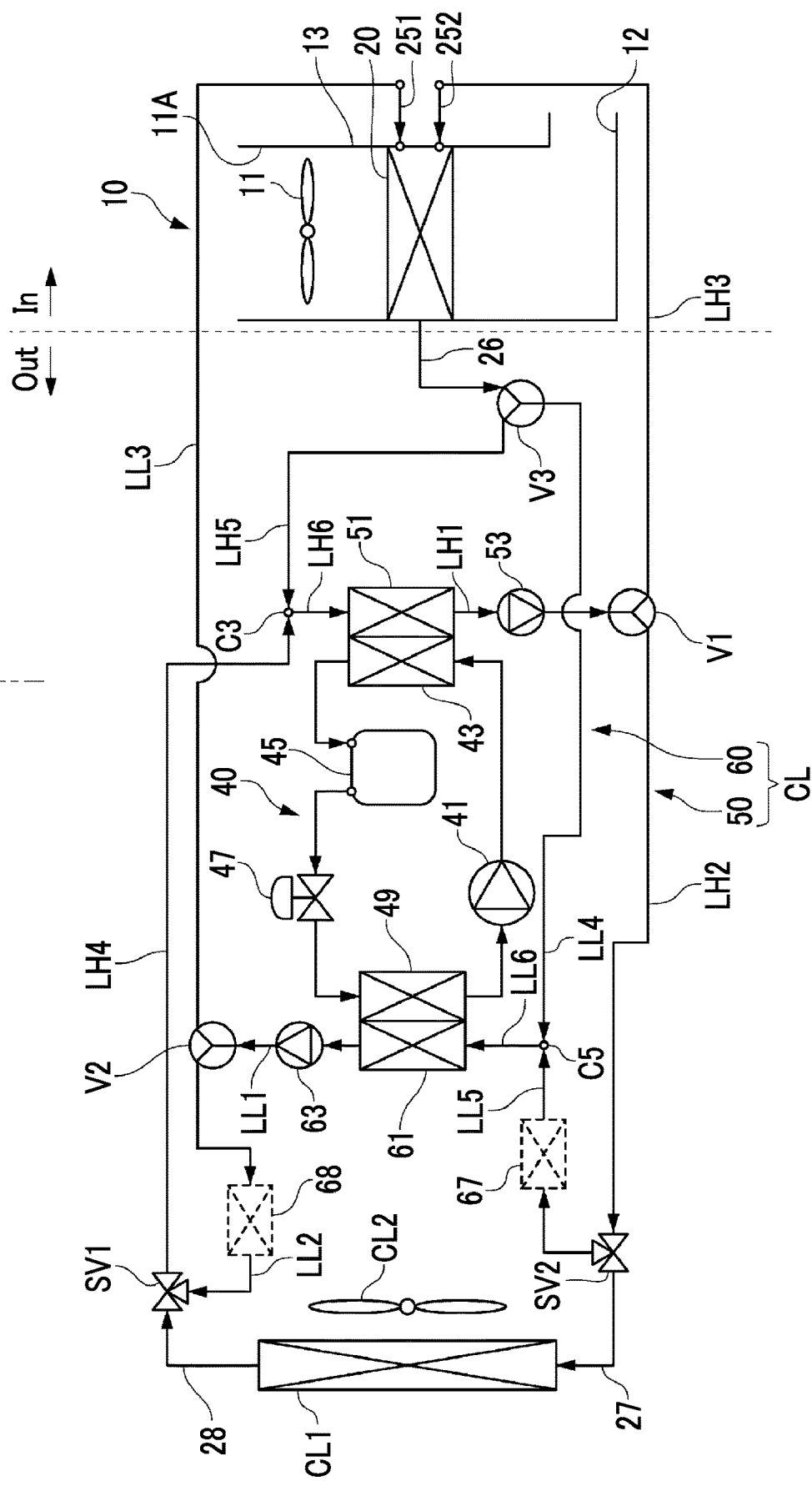
FIG. 4 is a view showing an example of a circuit configuration of an air conditioner for a vehicle including the air conditioning unit shown in FIG. 1.

The air conditioning unit 10 shown in FIG. 1 can configure the air conditioner 1 shown in FIG. 4. First, after describing the air conditioning unit 10, the air conditioner 1 will be described.

<Air Conditioning Unit>

The air conditioning unit 10 (FIG. 1) includes the heat exchanger 20 (first heat exchanger) that causes air and a coolant to exchange heat with each other, a blower 11 that supplies air to the heat exchanger 20, an air outflow portion 12 (121 to 123) through which air, which has passed through the heat exchanger 20, flows out from the air conditioning unit 10, and a duct 13 in which the heat exchanger 20 is disposed. The duct 13 also serves as a casing of the air conditioning unit 10.

One heat exchanger 20 included in the air conditioning unit 10 is sufficient. Unlike an HVAC unit in an example of the related art shown in FIG. 9 including two heat exchangers (91 and 92), the air conditioning unit 10 includes only one heat exchanger 20. The air conditioning unit 10 does not include elements corresponding to an air mix damper 93 and a mixing region 94 included in the HVAC unit shown in FIG. 9.

The air conditioning unit 10 is a so-called heating, ventilation, and air conditioning (HVAC), and has functions of cooling, heating, dehumidifying, and ventilating of the vehicle interior. The air conditioning unit 10 can be provided inside an interior panel such as a vehicle instrument panel. As for a posture in which the air conditioning unit 10 is provided, for example, an upper side and a lower side of FIG. 1 correspond to an upper side and a lower side of the air conditioning unit 10 in a vertical direction, a left side of FIG. 1 corresponds to a front side in a vehicle traveling direction, and a right side of FIG. 1 corresponds to a rear side in the vehicle traveling direction. However, without being limited thereto, the air conditioning unit 10 can be provided in an appropriate posture.

The air conditioning unit 10 supplies air sucked by the blower 11 to the heat exchanger 20, and causes the air, of which a temperature is regulated by passing through the heat exchanger 20, to flow out from the air outflow portion 12. In FIG. 1, the flow of air from the blower 11 to the air outflow portion 12 is schematically shown with solid arrows. The air flowed out from the air outflow portion 12 passes through a flow channel (not shown) to a plurality of blowing ports 31 to 33 (FIGS. 3A and 3B) provided in the interior panel, and is blown out to the vehicle interior.

The blowing ports 31 to 33 (FIGS. 3A and 3B) are, for example, the blowing port 31 for a face, through which air blows out toward the face of an occupant, the blowing port 32 for a window, through which air blows out toward a window of the vehicle, and the blowing port 33 for feet, through which air blows out toward the feet of the occupant. It is preferable that positions where the blowing ports 31 to 33 are provided in the panel of the vehicle interior are determined such that temperature-controlled air is efficiently supplied toward a supply destination such as the face, the window, and the feet.

With the air conditioning unit 10, air having an appropriate temperature can be supplied to each supply destination through each of the blowing ports 31 to 33. When an appropriate temperature of air blown out from the blowing port 31 for a face is set as T1, an appropriate temperature of air blown out from the blowing port 32 for a window is set as T2, and an appropriate temperature of air blown out from the blowing port 33 for feet is set as T3, a relative relationship therebetween is typically $T1<T2<T3$. In light of keeping the head cool and the feet warm, which is regarded preferable for performing air conditioning, $T1<T3$ is satisfied.

(Blower)

By being rotationally driven by a drive force of a motor (not shown), the blower 11 sucks air outside the vehicle (outside air) or air in the vehicle (inside air) from a suction portion 11A (FIG. 4) according to the selection of an outside air/inside air mode of the air conditioning unit 10. The air sucked by the blower 11 is discharged from a discharge portion 11B (FIG. 1) into the duct 13, and is supplied to the heat exchanger 20.

(Heat Exchanger)

By causing air supplied from the blower 11 and a coolant supplied from a coolant circuit CL shown in FIG. 4 to exchange heat with each other, the heat exchanger 20 (FIGS. 1 to 3B) obtains temperature-controlled air.

As will be described later, a high-temperature-side coolant and a low-temperature-side coolant are obtained through heat exchange with a refrigerant circulating in a refrigerant circuit 40 (FIG. 4) that is a heat pump cycle, which compresses the refrigerant and transports the refrigerant to a heat load with outside air as a heat source, and the refrigerant is supplied to the heat exchanger 20.

The coolant is, for example, a liquid for a heat medium such as pure water and brine, and water that cools an engine mounted on the vehicle can be used as the coolant.

Figure 2:
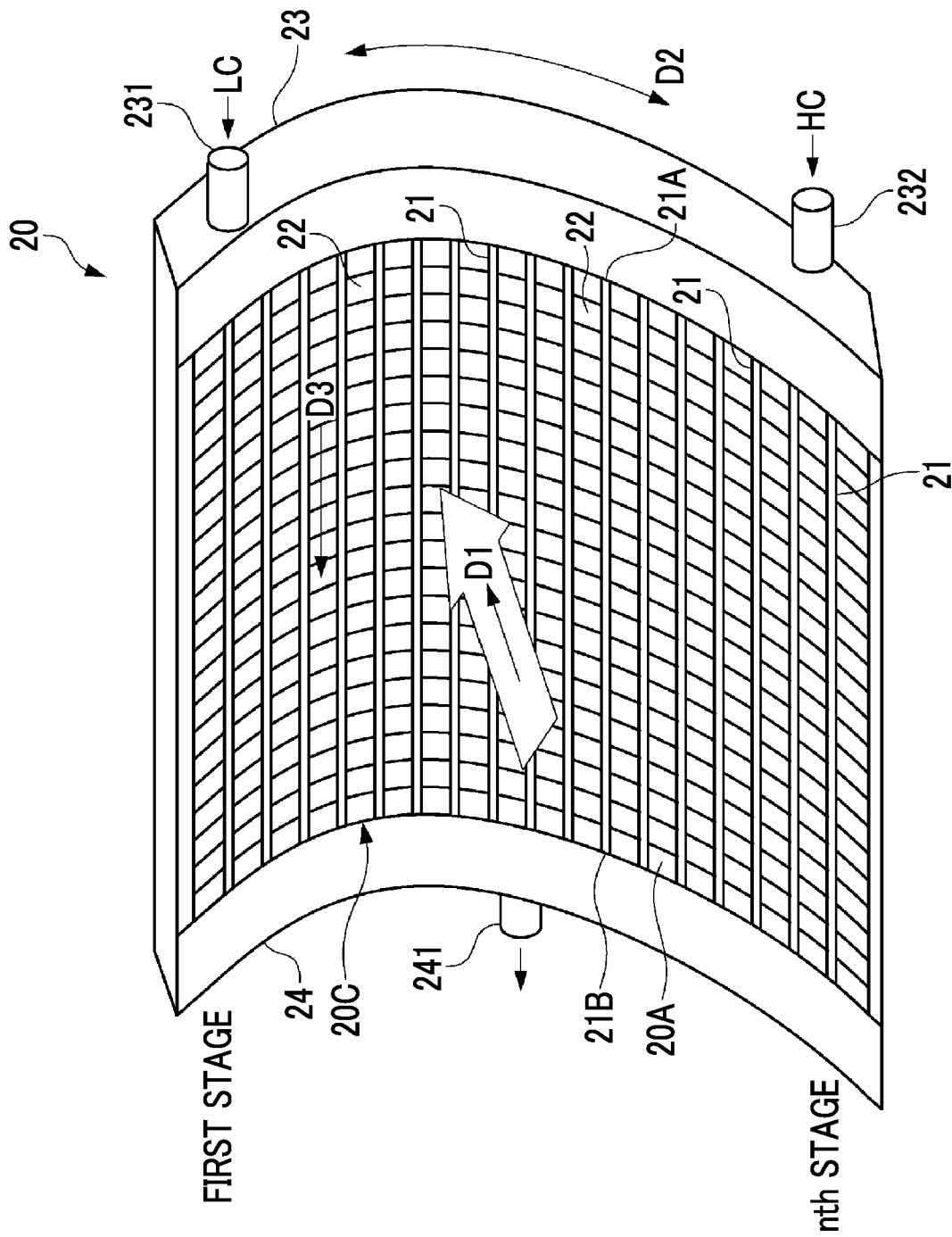
FIG. 2 is a perspective view schematically showing a heat exchanger shown in FIG. 1 from an upwind side.

As shown in FIGS. 1 and 2, the heat exchanger 20 includes a plurality of stacked flat tubes 21, a plurality of fins 22, an inlet header 23, and an outlet header 24.

Inside each of the tubes 21, a coolant flows. Each of the tubes 21 extends parallel to each other from an upstream end portion 21A on an upstream side, in which the coolant flows, to a downstream end portion 21B on a downstream side. Each of the tubes 21 extends in a direction orthogonal to the page of FIG. 1.

The tubes 21 can be formed by extrusion molding and roll molding using, for example, metallic materials excellent in thermal conductivity, such as copper, a copper alloy, aluminum, and an aluminum alloy. The fins 22 and the headers 23 and 24 can also be molded through an appropriate method using the same metallic materials as the tubes 21.

The fins 22 are thermally coupled to the tubes 21, are formed in a shape appropriate for increasing a heat transfer area between air and a coolant, and are assembled with the tubes 21. The fins 22 may be, for example, a corrugated type which is formed in a wavy shape and in which the fins are stacked alternately with the tubes 21, or may be a plate type in which the fins are disposed orthogonally to each of the stacked tubes 21.

A heat exchange core 20C having first to nth stages is configured by n tubes 21 and the plurality of fins 22 assembled with the tubes 21. Air is supplied in a direction D1 intersecting a direction D3 (FIG. 2), in which a coolant flows in the tubes 21, to an air supply surface 20A of the heat exchange core 20C by the blower 11. The air supplied to the air supply surface 20A exchanges heat with the coolant flowing in the tubes 21 while passing through a gap between the fins 22.

The direction D1 in which the air supplied to the heat exchanger 20 passes through the heat exchanger 20 will be called the air flow direction D1, and the direction D3 in which the coolant flows in the tubes 21 will be called the coolant flow direction D3.

The inlet header 23 and the outlet header 24 extend in a direction (D2) in which the tubes 21 are stacked.

A coolant flows into each of the stacked tubes 21 through the inlet header 23, and the coolant flowing in each of the tubes 21 flows out to the coolant circuit CL (FIG. 4) through the outlet header 24.

The inlet header 23 includes a space communicating with the upstream end portion 21A of each of the first stage tube 21 to the nth stage tube 21. An opening into which the upstream end portion 21A of each of the tubes 21 is inserted is formed in the inlet header 23.

The outlet header 24 includes a space communicating with the downstream end portion 21B of each of the first stage tube 21 to the nth stage tube 21. An opening into which the downstream end portion 21B of each of the tubes 21 is inserted is formed in the outlet header 24.

The tubes 21, the fins 22, the inlet header 23, and the outlet header 24 are bonded to each other, for example, through brazing.

The heat exchanger 20 of the present embodiment has a shape curved with respect to the air flow direction D1, in which air passes through the heat exchanger 20, as a whole. Specifically, the heat exchange core 20C has a shape of which a central portion in a direction of each of the first to nth stages (stacking direction) is curved in a direction of being convex downstream in the direction of flow of air with respect to both end portions. The inlet header 23 and the outlet header 24 also have a shape curved in the same direction.

As the heat exchanger 20 is curved, the heat exchanger 20 can be comfortably disposed inside the duct 13 under the restriction of a space allowed in the vehicle for providing the air conditioning unit 10. The heat exchanger 20 may be curved in an opposite direction to the direction shown in FIG. 1 in order to avoid other in-vehicle devices.

However, the heat exchanger 20 is not necessarily curved.

The heat exchanger 20 has a main feature in coolant inflow portions 231 and 232 (FIGS. 1 to 3B) through which a coolant can flow into the inlet header 23.

The inlet header 23 includes the low-temperature-side coolant inflow portion 231 and the high-temperature-side coolant inflow portion 232, which correspond to coolants having temperatures different from each other, respectively. A coolant flows into the inlet header 23 through at least one of the coolant inflow portions 231 and 232.

A coolant LC (low-temperature-side coolant) that has a relatively low temperature can flow into the low-temperature-side coolant inflow portion 231 from a low-temperature-side coolant circuit 60 to be described later. A coolant HC (high-temperature-side coolant) that has a relatively high temperature can flow into the high-temperature-side coolant inflow portion 232 from a high-temperature-side coolant circuit 50 to be described later, independently of the low-temperature-side coolant inflow portion 231.

The coolant which has flowed into the inlet header 23 from at least one of the coolant inflow portions 231 and 232 flows in each of the tubes 21, flows into the outlet header 24, and flows out from a coolant outflow portion 241 provided in the outlet header 24 to the coolant circuit CL.

For example, as schematically shown in FIG. 3A, the low-temperature-side coolant inflow portion 231 and the high-temperature-side coolant inflow portion 232 are shifted from each other in the air flow direction D1 and are shifted from each other in the intersecting direction D2 intersecting the air flow direction D1. Based on the shifts in the positions of the low-temperature-side coolant inflow portion 231 and the high-temperature-side coolant inflow portion 232, a temperature gradient in the intersecting direction D2 is given to air that is supplied to the heat exchanger 20 by the blower 11 and has exchanged heat with a coolant flowing in the tubes 21. This will be described later.

The intersecting direction D2 intersects both of the air flow direction D1 and the coolant flow direction D3.

As for the shift in the air flow direction D1, it is preferable that the low-temperature-side coolant inflow portion 231 is shifted on to upstream side in the air flow direction D1 from the high-temperature-side coolant inflow portion 232 in order to dehumidify air.

(Air Outflow Portion)

The air outflow portion 12 (FIG. 1) corresponds to an opening provided in a wall of the duct 13 in which air flows. A temperature gradient in the intersecting direction D2 intersecting the air flow direction D1 is given to air supplied to the heat exchanger 20 as passing through the heat exchanger 20. For this reason, it is possible to cause air having a temperature suitable for each of the blowing ports 31 to 33 to flow out from a position of a temperature range suitable for each of the blowing ports 31 to 33 in a region 131 (FIGS. 3A and 3B), which is adjacent to a downstream side of the heat exchanger 20 and extends in the intersecting direction D2, toward each of the blowing ports 31 to 33.

Air, which has passed through the heat exchanger 20 and is in a relatively different temperature range, flows out through the air outflow portion 12 toward each of the blowing port 31 for a face, the blowing port 32 for a window, and the blowing port 33 for feet.

The air outflow portion 12 is formed by the plurality of air outflow portions 121 to 123 individually corresponding to the plurality of blowing ports 31 to 33. Specifically, the air outflow portion 12 is formed by the low-temperature-side air outflow portion 121 through which air having a relatively low temperature flows out, the medium temperature air outflow portion 122 through which air having a relatively medium temperature flows out, and the high-temperature-side air outflow portion 123 through which air having a relatively high temperature flows out. The air outflow portions 121 to 123 are openings independent of each other, and are provided in the duct 13 by selecting a position where air having a temperature suitable for a corresponding blowing port is to be taken out from the region 131. The air outflow portions 121 to 123 may not necessarily be independent of each other, or the air outflow portions at positions close to each other are allowed to be integrated as one opening.

A blowing port corresponding to each of the air outflow portions 121 to 123 can be determined as appropriate in consideration of keeping the head cool and the feet warm.

In the present embodiment, the low-temperature-side air outflow portion 121 corresponds to the blowing port 31 for a face, the medium temperature air outflow portion 122 corresponds to the blowing port 32 for a window, and the high-temperature-side air outflow portion 123 corresponds to the blowing port 33 for feet.

Since the temperature of a side of the heat exchanger 20, which is close to the blowing port 31 for a face, can be made relatively low and the temperature of a side of the heat exchanger 20, which is close to the blowing port 33 for feet, can be made relatively high according to a posture in which the heat exchanger 20 is provided and the positions of the air outflow portions 121 to 123 in the present embodiment, the occupant's comfort can be improved by keeping the head cool and the feet warm.

The blowing port corresponding to each of the air outflow portions 121 to 123 is not limited to the present embodiment.

In the example shown in FIG. 1, the high-temperature-side air outflow portion 123 is positioned on a most upstream side of flow of air toward a trailing end 13A of the duct 13 from the heat exchanger 20, and the low-temperature-side air outflow portion 121 is positioned on a most downstream side. The medium temperature air outflow portion 122 through which air in an medium temperature range, which is between temperature ranges of air flowed out through the low-temperature-side air outflow portion 121 and the high-temperature-side air outflow portion 123 respectively, flows out is positioned between the high-temperature-side air outflow portion 123 and the low-temperature-side air outflow portion 121.

It is preferable to appropriately determine the position of each of the air outflow portions 121 to 123 according to the shape of the duct 13 or the heat exchanger 20 and the position of the heat exchanger 20 in the duct 13.

The size and direction of the opening of each of the air outflow portions 121 to 123 can be appropriately determined such that air flows smoothly to a corresponding blowing port while preventing a pressure loss.

(Workings and Effects of Air Conditioning Unit)

The workings of the air conditioning unit 10 will be described based on the configuration of the heat exchanger 20 (FIGS. 1 to 3B).

The coolant LC having a relatively low temperature flows into the inlet header 23 of the heat exchanger 20 from the low-temperature-side coolant inflow portion 231, and the coolant HC having a relatively high temperature flows into the inlet header from the high-temperature-side coolant inflow portion 232.

As described above, since the positions of the low-temperature-side coolant inflow portion 231 and the high-temperature-side coolant inflow portion 232 are shifted from each other in the direction of flow of air D1 and are shifted from each other also in the intersecting direction D2, a coolant which has flowed into the inlet header 23 from each of the low-temperature-side coolant inflow portion 231 and the high-temperature-side coolant inflow portion 232 flows unevenly into a close tube 21 from the inflow portion 231 or 232 that the coolant has flowed in.

For example, as shown in FIG. 3A, since the low-temperature-side coolant inflow portion 231 is positioned on the upstream side in the air flow direction D1 and one side (upper side of FIG. 3A) in the intersecting direction D2, the coolant LC which has flowed in from the low-temperature-side coolant inflow portion 231 mainly flows into the tube 21 disposed on a first stage side among the stacked tubes 21.

On the other hand, since the high-temperature-side coolant inflow portion 232 is positioned on a downstream side in the air flow direction D1 and the other side (lower side of FIG. 3A) in the intersecting direction D2 contrary to the low-temperature-side coolant inflow portion 231, the coolant HC which has flowed in from the high-temperature-side coolant inflow portion 232 mainly flows into the tube 21 disposed on an nth stage side among the stacked tubes 21.

A temperature gradient in a stage direction is given to a coolant flowing in each of the tubes 21 in the coolant flow direction D3. For this reason, the same temperature gradient is given also to air that is supplied to the heat exchanger 20 by the blower 11 and gives and receives heat to and from the coolant flowing in each of the tubes 21.

FIG. 3B shows that a temperature gradient existing in a coolant flowing in the tube 21 of each stage in the heat exchanger 20 is in a pattern different for each temperature range. A relationship as to which temperature ranges B1, B2, B3, B4, and B5 are higher or lower is B1<B2<B3<B4<B5. Since such a temperature gradient is given to air that gives and receives heat to and from the coolant while passing through the heat exchanger 20, flow F of air that has immediately passed through the heat exchanger 20 from the first to nth stages also has the same temperature gradient as the temperature gradient shown in FIG. 3B.

As described above, in the present embodiment, a direction in which the coolant inflow portions 231 and 232 are shifted from each other is set such that the low-temperature-side coolant inflow portion 231 is positioned on the upstream side in the air flow direction D1 with respect to the high-temperature-side coolant inflow portion 232. For this reason, as shown in FIG. 3B, when flowing into the heat exchanger 20, a large amount of air supplied to the heat exchanger 20 passes through the temperature ranges B1 and B2 in which the temperature of a coolant is relatively low. After a dew point temperature is lowered as the air is sufficiently cooled by exchanging heat with the coolant in the temperature ranges B1 and B2 and the air is efficiently dehumidified, air, of which a temperature is increased as the air passes through the temperature ranges B3 to B5 in which the temperature of a coolant is higher, is supplied to a supply destination. For this reason, it is possible to contribute to prevention of fogging of a window and improvement of comfort in the vehicle interior.

Although the heat exchanger 20 is shown in a shape simplified into a rectangular shape in FIGS. 3A and 3B, the same temperature gradient as shown in FIG. 3B is given to air, which has passed through the heat exchanger 20, even when the heat exchanger 20 is curved as shown in FIGS. 1 and 2, based on the fact that the positions of the low-temperature-side coolant inflow portion 231 and the high-temperature-side coolant inflow portion 232 are shifted from each other.

The heat exchanger 20 may actually be formed in a rectangular shape.

As described above, when the low-temperature-side coolant inflow portion 231 and the high-temperature-side coolant inflow portion 232 are shifted from each other in the air flow direction D1 and the intersecting direction D2, a temperature gradient is given to the region 131 adjacent to the downstream side of the heat exchanger 20. The air temperature is distributed in the stage direction from the first to nth stages, that is, in the region 131 over a wide range in the intersecting direction D2.

Figure 9:
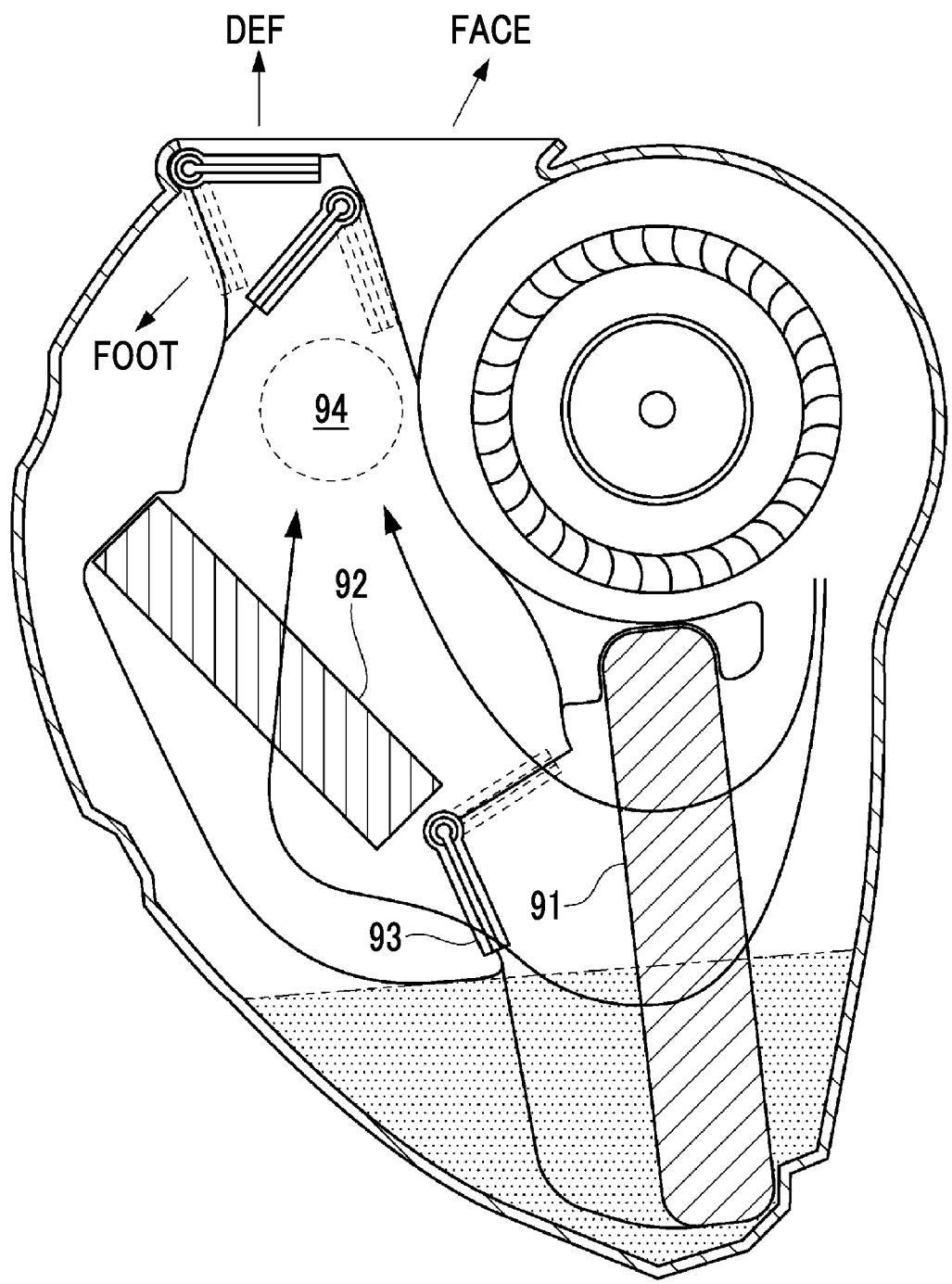
FIG. 9 is a view showing an inside of an air conditioning unit for a vehicle of the related art.

For example, as shown in FIG. 9, in the HVAC unit including the two heat exchangers (91 and 92), it is difficult to expand the mixing region 94 positioned in the vicinity of a trailing end of a duct due to the restriction of the volume of the unit. When it is required to distribute air in different temperature ranges obtained by mixing of air that has passed through only the heat exchanger 91 and air that has passed through both of the heat exchangers 91 and 92 to each blowing port from such a mixing region 94, it is difficult to distribute air having an appropriate temperature to each blowing port in some cases.

On the contrary, air in a temperature range suitable for each supply destination can be easily and reliably distributed to a plurality of supply destinations, to which temperature-controlled air is to be supplied, from the region 131 of the present embodiment by selecting an appropriate position and causing air in an appropriate temperature to flow out through the air outflow portion 12 (121 to 123) provided in the duct 13.

In addition, since a blowing port for feet positioned in a lower part of the vehicle interior is far from the mixing region 94 positioned at an upper end of the HVAC unit in the configuration shown in FIG. 9, it is difficult to secure a flow channel corresponding to an air amount necessary for the blowing port in some cases.

On the contrary, in a case where, in accordance with an up-and-down direction of the page of FIG. 1, the heat exchanger 20 is disposed to extend in the up-and-down direction in general as in the present embodiment, the high-temperature-side air outflow portion 123 is positioned at a lowermost position among the air outflow portions 121 to 123, and is close to the position of the blowing port 33 for feet, which is usually positioned in the lower part of the vehicle interior. For this reason, a sufficient amount of air can be supplied from the high-temperature-side air outflow portion 123 to the blowing port 33 for feet while preventing a pressure loss.

<Air Conditioner>

Next, an example of a configuration of the air conditioner 1 including the air conditioning unit 10 will be described with reference to FIG. 4. In the air conditioner 1, as will be described below, functions of cooling and heating can be performed with only one heat exchanger 20 given to the air conditioning unit 10 as a low-temperature-side coolant (for example, chilled water) and a high-temperature-side coolant (for example, warm water) are suppliable to the heat exchanger 20 of the air conditioning unit 10.

In the air conditioner 1, each of a condenser 43 and an evaporator 49 of a steam compression refrigerating cycle exchanges heat with a coolant. As shown in FIG. 4, the air conditioner 1 includes the refrigerant circuit 40, the coolant circuit CL that includes the high-temperature-side coolant circuit 50 and the low-temperature-side coolant circuit 60, the air conditioning unit 10 described above, a vehicle exterior heat exchanger CL1 (second heat exchanger), a fan CL2, and a controller 70 that controls an operation of the air conditioner 1. In addition, the air conditioner 1 is provided with a first regulating valve V1, a second regulating valve V2, a third regulating valve V3, a first electromagnetic valve SV1, and a second electromagnetic valve SV2. The valves are controlled by the controller 70.

The high-temperature-side coolant circuit 50 sends a coolant having a high temperature, which has exchanged heat with a high temperature refrigerant through the condenser 43, and regulates the distribution of the flow rate of a coolant to be sent to each of the vehicle exterior heat exchanger CL1 and the heat exchanger 20 (vehicle interior heat exchanger) of the air conditioning unit 10 through the first regulating valve V1 according to an air conditioning load.

The low-temperature-side coolant circuit 60 sends a coolant having a low temperature, which has exchanged heat with a low temperature refrigerant through the evaporator 49, and regulates the distribution of the flow rate of a coolant to be sent to each of the vehicle exterior heat exchanger CL1 and the heat exchanger 20 through the second regulating valve V2 according to an air conditioning load.

The air conditioner 1 has a configuration described below in order to realize the functions described above.

(Refrigerant Circuit)

As shown in FIG. 4, the refrigerant circuit 40 is provided in a vehicle exterior Out.

The refrigerant circuit 40 includes a compressor 41 that compresses a refrigerant, the condenser 43 that is a heat exchanger which performs heat exchange between a high temperature and high pressure gas refrigerant compressed by the compressor 41 and a high-temperature-side coolant flowing in the high-temperature-side coolant circuit 50, a liquid receiver 45, an expansion valve 47 that is a decompression unit which decompresses a refrigerant flowing out from the liquid receiver 45, and the evaporator 49 that is a heat exchanger which performs heat exchange between the refrigerant decompressed by the expansion valve 47 and a low-temperature-side coolant flowing in the low-temperature-side coolant circuit 60.

The high temperature and high pressure gas refrigerant exchanges heat with the high-temperature-side coolant and is condensed by the condenser 43. At this time, since the gas refrigerant releases condensation heat, the temperature of the high-temperature-side coolant used in cooling rises. The state of the refrigerant changes from a gas to a liquid due to condensation, and becomes a high temperature and high pressure liquid. The liquid refrigerant flows into the liquid receiver 45.

Since the expansion valve 47 releases a refrigerant after restricting the flow of a high temperature and high pressure liquid refrigerant, the pressure of the refrigerant drops sharply. For this reason, a refrigerant in the evaporator 49 easily evaporates. In the evaporator 49, the refrigerant evaporates by taking away evaporation heat from a low-temperature-side coolant. For this reason, the temperature of the low-temperature-side coolant decreases. The low temperature and low pressure gas refrigerant which has passed through the evaporator 49 flows into the compressor 41, and is compressed into a high temperature and high pressure gas refrigerant. A refrigerating cycle is repeated from each of processes including condensation by the condenser 43, decompression by the expansion valve 47, and evaporation by the evaporator 49, in addition to the compression of the gas refrigerant.

(High-Temperature-Side Coolant Circuit)

The high-temperature-side coolant circuit 50 includes a high-temperature-side heat exchanger 51 that is provided side by side with the condenser 43 of the refrigerant circuit 40 and performs heat exchange between a refrigerant flowing in the condenser 43 and a high-temperature-side coolant and a high-temperature-side circulation pump 53 that circulates the high-temperature-side coolant.

The first regulating valve V1 regulates the flow of a high-temperature-side coolant to any one or both of the heat exchanger 20 and the vehicle exterior heat exchanger CL1. The first regulating valve V1 can be configured by a so-called three-way valve, and can regulate the distribution of the high-temperature-side coolant flowing in the heat exchanger 20 and the vehicle exterior heat exchanger CL1. The regulating valve can regulate the flow rate.

The third regulating valve V3 regulates the flow of a coolant flowed out from the heat exchanger 20 to any one or both of the high-temperature-side coolant circuit 50 and the low-temperature-side coolant circuit 60.

The first electromagnetic valve SV1 and the second electromagnetic valve SV2 selectively cause any one of a high-temperature-side coolant and a low-temperature-side coolant to flow into the vehicle exterior heat exchanger CL1.

The first electromagnetic valve SV1 allows or prevents the coolant from the vehicle exterior heat exchanger CL1 from flowing into the high-temperature-side heat exchanger 51 via an exhaust heat collector 68.

The second electromagnetic valve SV2 allows or prevents the coolant from the vehicle exterior heat exchanger CL1 from flowing into an exhaust heat collector 67.

The high-temperature-side circulation pump 53 has one end connected to a downstream side of the high-temperature-side heat exchanger 51 and the other end provided on a flow channel of a pipe LH1 connected to the first regulating valve V1. The downstream side is based on a direction in which a high-temperature-side coolant flows in the high-temperature-side heat exchanger 51.

One end of a pipe LH2 and one end of a pipe LH3 are connected to the first regulating valve V1. The other end of the pipe LH2 is connected to the vehicle exterior heat exchanger CL1 via a connection pipe 27. The other end of the pipe LH3 is connected to the inlet header 23 (FIG. 2) of the heat exchanger 20 via a connection pipe 252.

One end of a pipe LH6 is connected to an upstream side of the high-temperature-side heat exchanger 51, and a confluence point C3 is provided at the other end of the pipe LH6. One end of a pipe LH4 and one end of a pipe LH5 are connected to the confluence point C3. The other end of the pipe LH4 is connected to the vehicle exterior heat exchanger CL1 via a connection pipe 28, and is also connected to a pipe LL2 of the low-temperature-side coolant circuit 60. The first electromagnetic valve SV1 described above is provided on a flow channel of the pipe LH4. The other end of the pipe LH5 is connected to the third regulating valve V3. The third regulating valve V3 is connected to the outlet header 24 (FIG. 2) of the heat exchanger 20 via a connection pipe 26.

In FIG. 4, arrows shown in the pipes LH1 to LH6 indicate a direction in which a high-temperature-side coolant flows. Although the direction in which the high-temperature-side coolant flows is shown for all of the pipes LH1 to LH6 in FIG. 4, there also is a pipe in which the high-temperature-side coolant does not flow, among the pipes LH1 to LH6, depending on an operation mode of the air conditioner 1. The same applies to pipes LL1 to LL6 to be described later.

(Low-Temperature-Side Coolant Circuit)

The low-temperature-side coolant circuit 60 includes a low-temperature-side heat exchanger 61 that is provided side by side with the evaporator 49 of the refrigerant circuit 40 and performs heat exchange between a refrigerant flowing in the evaporator 49 and a low-temperature-side coolant, a low-temperature-side circulation pump 63 that circulates the low-temperature-side coolant, and the exhaust heat collectors 67 and 68 that collect heat from air discharged from the vehicle interior In to the outside.

Instead of the exhaust heat collectors 67 and 68, a heat exchanger or an electric heater that collects vehicle device exhaust heat or ventilation exhaust heat can also be provided.

The second regulating valve V2 regulates the flow of a low-temperature-side coolant to any one or both of the heat exchanger 20 and the vehicle exterior heat exchanger CL1. The second regulating valve V2 can be configured by a so-called three-way valve, and can regulate the distribution of the low-temperature-side coolant flowing in the heat exchanger 20 and the vehicle exterior heat exchanger CL1.

The low-temperature-side circulation pump 63 has one end connected to a downstream side of the low-temperature-side heat exchanger 61 and the other end provided on a flow channel of the pipe LL1 connected to the second regulating valve V2.

One end of the pipe LL2 and one end of the pipe LL3 are connected to the second regulating valve V2. The exhaust heat collector 68 and the first electromagnetic valve SV1 are provided on a flow channel of the pipe LL2. The other end of the pipe LL2 is connected to the vehicle exterior heat exchanger CL1 via the connection pipe 28. The other end of the pipe LL3 is connected to the heat exchanger 20 via a connection pipe 251.

One end of the pipe LL6 is connected to an upstream side of the low-temperature-side heat exchanger 61, and a confluence point C5 is provided at the other end of the pipe LL6. One end of the pipe LL4 and one end of the pipe LL5 are connected to the confluence point C5. The other end of the pipe LL4 is connected to the third regulating valve V3. In addition, the other end of the pipe LL5 is connected to the vehicle exterior heat exchanger CL1 via the connection pipe 27, and is also connected to the pipe LH2 of the high-temperature-side coolant circuit 50. The exhaust heat collector 67 and the second electromagnetic valve SV2 are provided on a flow channel of the pipe LL5.

(Operation of Air Conditioner)

While the air conditioner 1 is operating, the high-temperature-side heat exchanger 51 continuously performs heat exchange between a high temperature and high pressure gas refrigerant and a high-temperature-side coolant, and the low-temperature-side heat exchanger 61 continuously performs heat exchange between a refrigerant decompressed by the expansion valve 47 and a low-temperature-side coolant.

The air conditioner 1 realizes a plurality of operation modes by distributing the high-temperature-side coolant and the low-temperature-side coolant to the heat exchanger 20 and the vehicle exterior heat exchanger CL1.

An operation of the air conditioner 1 for each operation mode will be described with reference to FIGS. 5A to 6B.

Figure 5A:
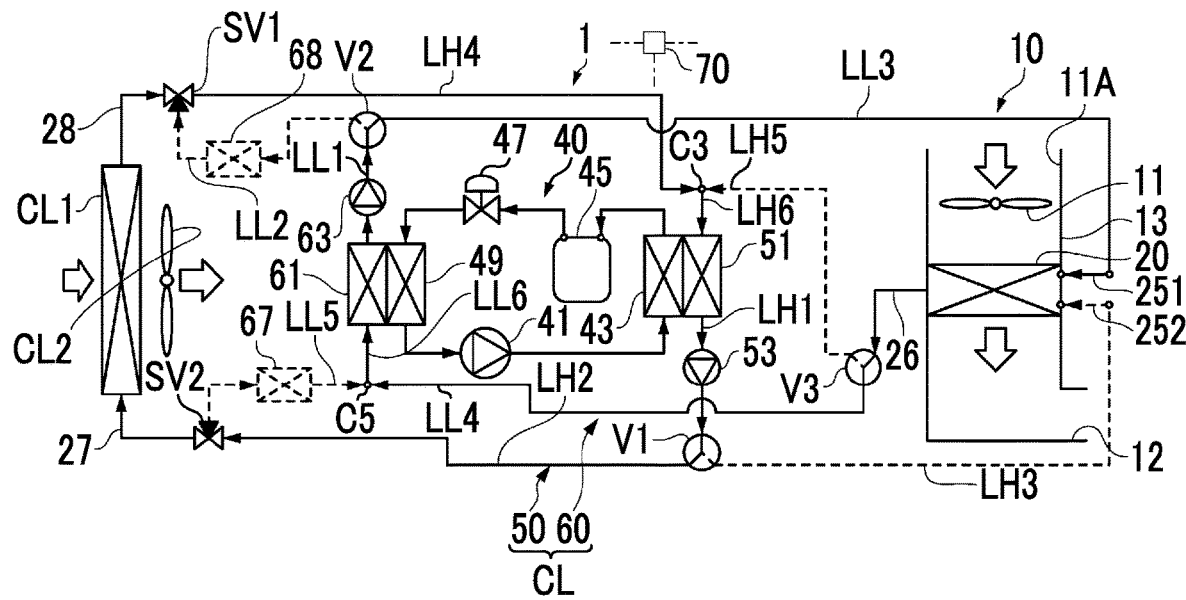
FIGS. 5A and 5B are views for describing flow of a coolant corresponding to each operation mode of the air conditioner shown in FIG. 4.
Figure 5B:
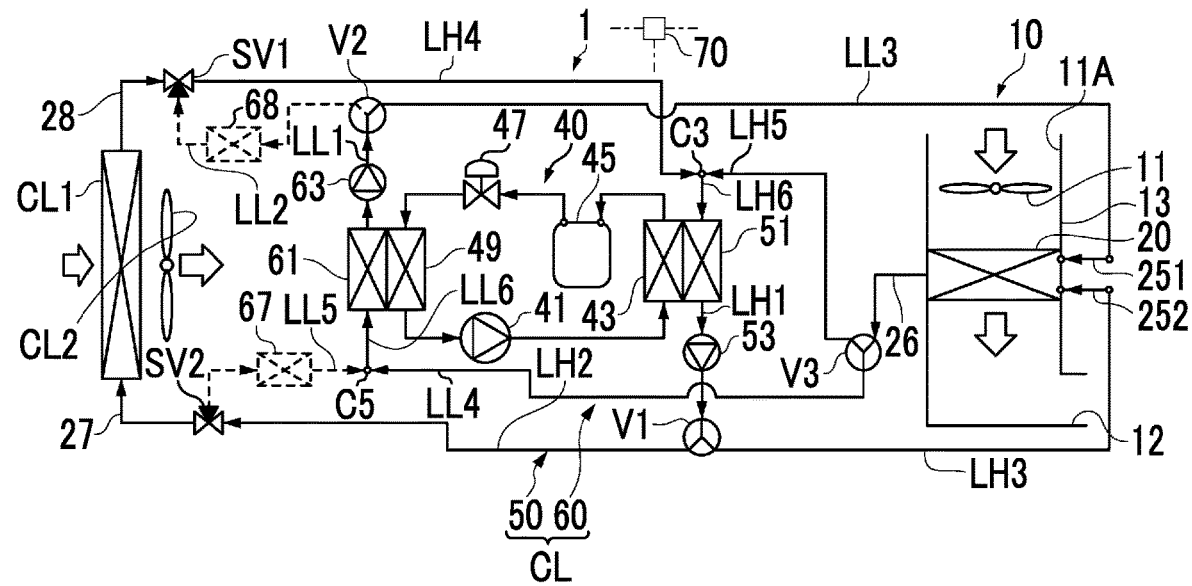
Figure 6A:
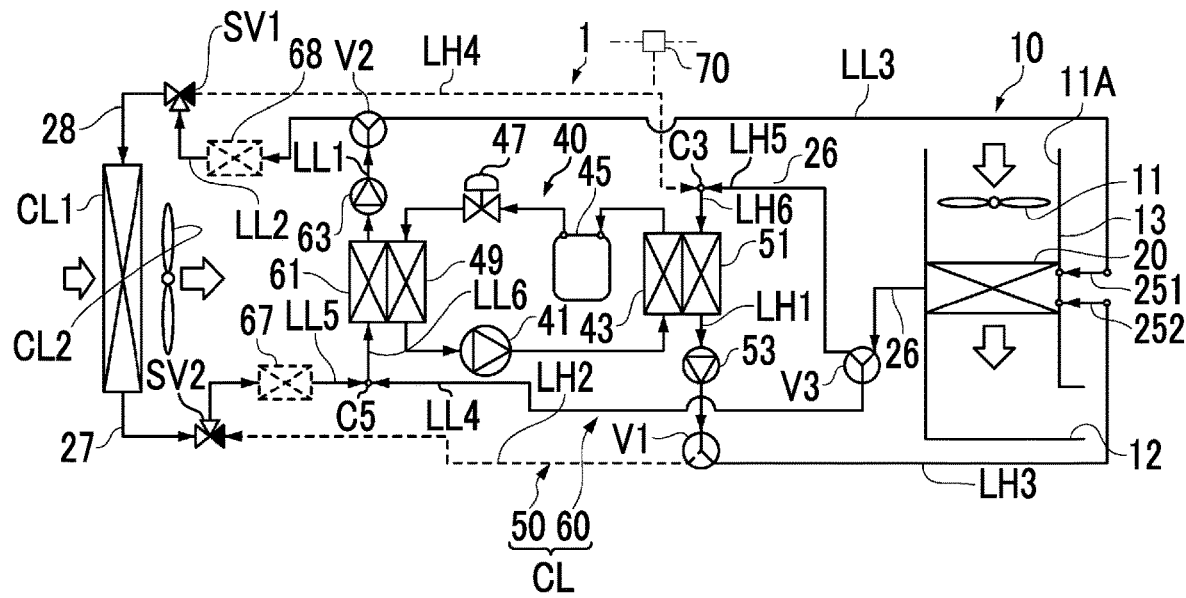
FIGS. 6A and 6B are views for describing the flow of the coolant corresponding to each operation mode of the air conditioner shown in FIG. 4.
Figure 6B:
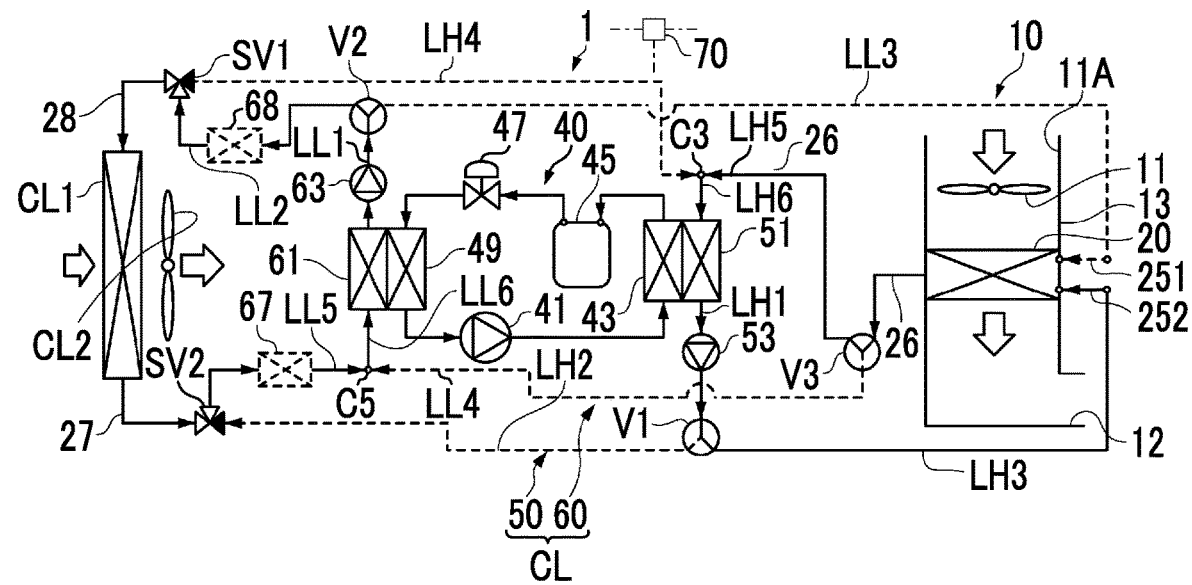

The air conditioner 1 of the present embodiment operates in any one of four modes including the pure cooling mode shown in FIG. 5A, the mild cooling mode shown in FIG. 5B, a mild heating and dehumidified heating mode shown in FIG. 6A, and a pure heating mode shown in FIG. 6B.

(Pure Cooling Mode)

As shown in FIG. 5A, in the pure cooling mode, only a low-temperature-side coolant is sent to the heat exchanger 20 by the low-temperature-side coolant circuit 60, and a high-temperature-side coolant flowing in the high-temperature-side coolant circuit 50 circulates between the high-temperature-side heat exchanger 51 and the vehicle exterior heat exchanger CL1.

In order to realize the pure cooling mode, the first regulating valve V1, the third regulating valve V3, the second regulating valve V2, the first electromagnetic valve SV1, and the second electromagnetic valve SV2 are controlled as follows.

ON means that a flow channel is open, and OFF means that the flow channel is closed.

The first regulating valve V1: A flow channel to the pipe LH2; ON: A flow channel to the pipe LH3; OFF The third regulating valve V3: A flow channel to the pipe LH5; OFF: A flow channel to the pipe LL4; ON The second regulating valve V2: A flow channel to the pipe LL2; OFF: A flow channel to the pipe LL3; ON The first electromagnetic valve SV1: ON The second electromagnetic valve SV2: OFF In FIGS. 5A to 6B, a flow channel section where a coolant does not flow as the valve is turned off is shown by a broken line.

In the pure cooling mode, a high-temperature-side coolant circulates in the high-temperature-side heat exchanger 51, the high-temperature-side circulation pump 53, the first regulating valve V1, and the vehicle exterior heat exchanger CL1 in this order. That is, the high-temperature-side coolant is not sent to the heat exchanger 20, and circulates in the closed high-temperature-side coolant circuit 50.

In the pure cooling mode, a low-temperature-side coolant circulates in the low-temperature-side heat exchanger 61, the low-temperature-side circulation pump 63, the second regulating valve V2, the heat exchanger 20, and the third regulating valve V3 in this order. The low-temperature-side coolant is not sent to the vehicle exterior heat exchanger CL1.

As described above, in the pure cooling mode, only the low-temperature-side coolant is sent to the heat exchanger 20, and the cooling of the vehicle interior In is realized.

(Mild Cooling Mode)

As shown in FIG. 5B, in the mild cooling mode in which the degree of cooling is lower than in the pure cooling mode, the low-temperature-side coolant circuit 60 sends a low-temperature-side coolant to the heat exchanger 20, and the high-temperature-side coolant circuit 50 sends some of a high-temperature-side coolant to the heat exchanger 20 and sends the remaining high-temperature-side coolant to the vehicle exterior heat exchanger CL1.

In order to realize the mild cooling mode, the first regulating valve V1, the third regulating valve V3, the second regulating valve V2, the first electromagnetic valve SV1, and the second electromagnetic valve SV2 are controlled as follows.

Since the flow rate of a coolant is appropriately distributed according to an air conditioning load, turning on the first regulating valve V1 and the third regulating valve V3 means a predetermined opening degree is given.

The first regulating valve V1: The flow channel to the pipe LH2; ON: The flow channel to the pipe LH3; ON The third regulating valve V3: The flow channel to the pipe LH5; ON: The flow channel to the pipe LL4; ON The second regulating valve V2: The flow channel to the pipe LL2; OFF: The flow channel to the pipe LL3; ON The first electromagnetic valve SV1: ON The second electromagnetic valve SV2: OFF In the mild cooling mode, a high-temperature-side coolant circulates in the high-temperature-side heat exchanger 51, the high-temperature-side circulation pump 53, the first regulating valve V1, the heat exchanger 20, and the third regulating valve V3 in this order, and circulates in the high-temperature-side heat exchanger 51, the high-temperature-side circulation pump 53, the first regulating valve V1, and the vehicle exterior heat exchanger CL1 in this order.

In the mild cooling mode, a low-temperature-side coolant circulates in the same manner as in the pure cooling mode.

(Mild Heating and Dehumidified Heating Mode)

As shown in FIG. 6A, in the mild heating and dehumidified heating mode, the high-temperature-side coolant circuit 50 sends a high-temperature-side coolant to the heat exchanger 20, sends some of a low-temperature-side coolant flowing in the low-temperature-side coolant circuit 60 to the heat exchanger 20, and sends the remaining low-temperature-side coolant to the vehicle exterior heat exchanger CL1.

Also in the mild heating and dehumidified heating mode, both of a low-temperature-side coolant and a high-temperature-side coolant are supplied to the heat exchanger 20 as in the mild cooling mode. However, in the mild heating and dehumidified heating mode, the flow rate of the low-temperature-side coolant supplied to the heat exchanger 20 is low compared to the mild cooling mode, and conversely, the flow rate of the high-temperature-side coolant is high. In the mild heating and dehumidified heating mode, the degree of heating is lower than in the pure heating mode (FIG. 6B) in which the low-temperature-side coolant is not supplied to the heat exchanger 20.

In order to realize the mild heating and dehumidified heating mode, the first regulating valve V1, the third regulating valve V3, the second regulating valve V2, the first electromagnetic valve SV1, and the second electromagnetic valve SV2 are controlled as follows.

Since the flow rate of a coolant is appropriately distributed according to an air conditioning load, turning on the second regulating valve V2 and the third regulating valve V3 means a predetermined opening degree is given.

The first regulating valve V1: The flow channel to the pipe LH2; OFF: The flow channel to the pipe LH3; ON The third regulating valve V3: The flow channel to the pipe LH5; ON: The flow channel to the pipe LL4; ON The second regulating valve V2: The flow channel to the pipe LL2; ON: The flow channel to the pipe LL3; ON The first electromagnetic valve SV1: OFF The second electromagnetic valve SV2: ON In the mild heating and dehumidified heating mode, a high-temperature-side coolant circulates in the high-temperature-side heat exchanger 51, the high-temperature-side circulation pump 53, the first regulating valve V1, the heat exchanger 20, and the third regulating valve V3 in this order.

In the mild heating and dehumidified heating mode, a low-temperature-side coolant circulates in the low-temperature-side heat exchanger 61, the low-temperature-side circulation pump 63, the second regulating valve V2, the heat exchanger 20, and the third regulating valve V3 in this order, and circulates in the low-temperature-side heat exchanger 61, the low-temperature-side circulation pump 63, the second regulating valve V2, the exhaust heat collector 68, the vehicle exterior heat exchanger CL1, and the exhaust heat collector 67 in this order.

(Pure Heating Mode)

As shown in FIG. 6B, in the pure heating mode, only a high-temperature-side coolant is sent to the heat exchanger 20 by the high-temperature-side coolant circuit 50, and a low-temperature-side coolant flowing in the low-temperature-side coolant circuit 60 circulates between the low-temperature-side heat exchanger 61 and the vehicle exterior heat exchanger CL1.

In order to realize the pure heating mode, the first regulating valve V1, the third regulating valve V3, the second regulating valve V2, the first electromagnetic valve SV1, and the second electromagnetic valve SV2 are controlled as follows.

The first regulating valve V1: The flow channel to the pipe LH2; OFF: The flow channel to the pipe LH3; ON The third regulating valve V3: The flow channel to the pipe LH5; ON: The flow channel to the pipe LL4; OFF The second regulating valve V2: The flow channel to the pipe LL2; ON: The flow channel to the pipe LL3; OFF The first electromagnetic valve SV1: OFF The second electromagnetic valve SV2: ON In the pure heating mode, a high-temperature-side coolant circulates in the high-temperature-side heat exchanger 51, the high-temperature-side circulation pump 53, the first regulating valve V1, the heat exchanger 20, and the third regulating valve V3 in this order.

In the pure heating mode, a low-temperature-side coolant circulates in the low-temperature-side heat exchanger 61, the low-temperature-side circulation pump 63, the second regulating valve V2, the exhaust heat collector 68, the vehicle exterior heat exchanger CL1, and the exhaust heat collector 67 in this order.

As described above, in the pure heating mode, only the high-temperature-side coolant is sent to the heat exchanger 20, and the heating of the vehicle interior In is realized.

(Effects of Air Conditioner)

In the air conditioner 1 of the present embodiment, one or both of a high-temperature-side coolant heated as exchanging heat with a refrigerant in the refrigerant circuit 40 by means of the high-temperature-side coolant circuit 50 and a low-temperature-side coolant cooled as exchanging heat with the refrigerant in the refrigerant circuit 40 by means of the low-temperature-side coolant circuit 60 are supplied to the heat exchanger 20. The air conditioner 1 can perform cooling and heating as described above even when only one heat exchanger 20 is provided in the air conditioning unit 10.

That is, since the air conditioner 1 has functions of heating and cooling and can reduce the number of the air conditioning units 10 necessary for the heat exchanger 20 to one, the air conditioning unit 10 can be miniaturized. As is clear from comparing the air conditioning unit 10 shown in FIG. 1 to the HVAC unit shown in FIG. 9, the volume of the air conditioning unit 10 is smaller than the volume of the HVAC unit including the two heat exchangers (91 and 92) by a region indicated with a shaded pattern in FIG. 9.

In addition, since the air conditioner 1 has only one heat exchanger 20, it is not necessary to include the air mix damper (93 of FIG. 9). Accordingly, the following effects are obtained.

Wind noise generated when the opening degree of the air mix damper is particularly small can be eliminated.

In addition, a driving source such as a motor that drives the air mix damper is not necessary, and a moving portion in the air conditioning unit 10 can be eliminated by eliminating the air mix damper. For this reason, the weight and cost of the air conditioning unit 10 can be reduced, and reliability can be improved.

When there is only one heat exchanger 20 and the air mix damper is eliminated, a large cross sectional area of the flow channel for air in the duct 13 can be secured. For this reason, since a flow speed can be decreased under constant air flow rate, noise can be reduced.

Further, since a pressure loss of air flowing in the duct 13 is reduced as there is only one heat exchanger 20 included in the air conditioning unit 10, power input to the blower 11 can be reduced.

In addition, since a direction in which a refrigerant flows in the refrigerant circuit 40 is constant, it is not necessary to provide the air conditioner 1 with a flow channel switching valve such as a four-way valve. Therefore, a decrease in air conditioning performance, which is attributable to a refrigerant pressure loss caused by the flow channel switching valve, and the generation of refrigerant flowing noise when passing through the valve can be avoided.

In addition, since the refrigerant circuit 40 is provided in the vehicle exterior Out, the air conditioner 1 has a low risk of a refrigerant leaking to the vehicle interior In. Therefore, a heating capacity can be increased by using a refrigerant (R454C) having considerable combustibility and a high pressure refrigerant such as $CO_2$ without necessarily preventing a refrigerant leak by increasing the size of a device configuring the refrigerant circuit 40.

In addition, since a risk of combustion at the time of a refrigerant leak can be decreased by using water as a coolant, in this respect, it is possible to use a refrigerant having combustibility.

Since the temperature of a refrigerant flowing in the evaporator 49 is made lower than an outside air temperature to absorb heat from outside air at the time of heating, an evaporation temperature (low pressure) of the evaporator 49 depends on the outside air temperature. The temperature of a low-temperature-side coolant that exchanges heat with a refrigerant by means of the low-temperature-side heat exchanger 61 and is supplied to the heat exchanger 20 used in dehumidifying also corresponds to the evaporation temperature.

However, in the air conditioner 1, even under a frost generation condition in which a refrigerant temperature falls below 0° C. since the outside air temperature is low, the temperature of the low-temperature-side coolant flowing in the heat exchanger 20 can be maintained at 0° C. or higher through mixing between the low-temperature-side coolant and a high-temperature-side coolant in the coolant circuit CL. For this reason, heating performance can be maintained by preventing frost on the heat exchanger 20.

Each operation mode of the air conditioner 1, which is described above, is merely an example, and is not limited to the description above.

For example, it is allowed that a small amount of high-temperature-side coolant is also supplied to the inlet header 23 of the heat exchanger 20 while a low-temperature-side coolant is supplied in the pure cooling mode, and a small amount of low-temperature-side coolant is also supplied to the inlet header 23 of the heat exchanger 20 while the high-temperature-side coolant is supplied in the pure heating mode. In this case, also in the pure cooling mode and the pure heating mode, a temperature gradient can be given to air which has passed through the heat exchanger 20, and keeping the head cool and the feet warm can be achieved.

Second Embodiment

Next, a heat exchanger 80 according to a second embodiment of the present invention will be described with reference to FIGS. 7A to 8. Hereinafter, points different from the first embodiment will be mainly described.

Figure 7A:
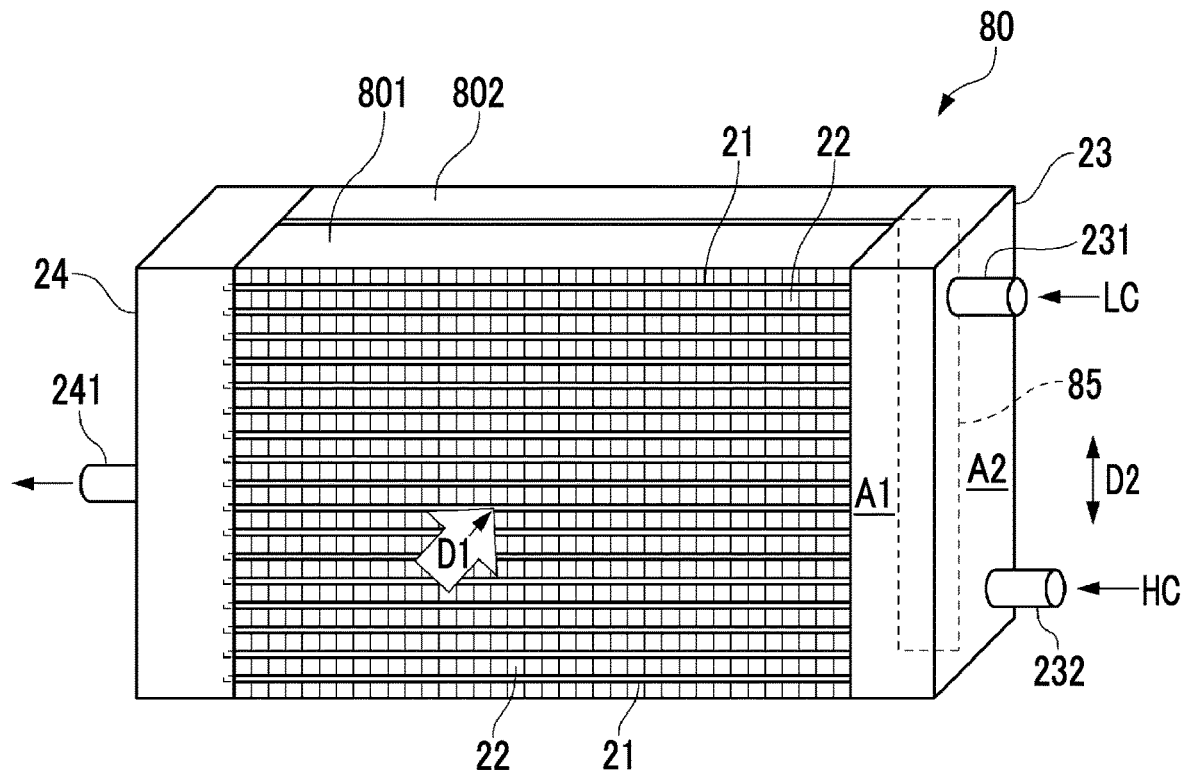
FIGS. 7A and 7B are views showing a heat exchanger according to a second embodiment of the present invention.
Figure 7B:
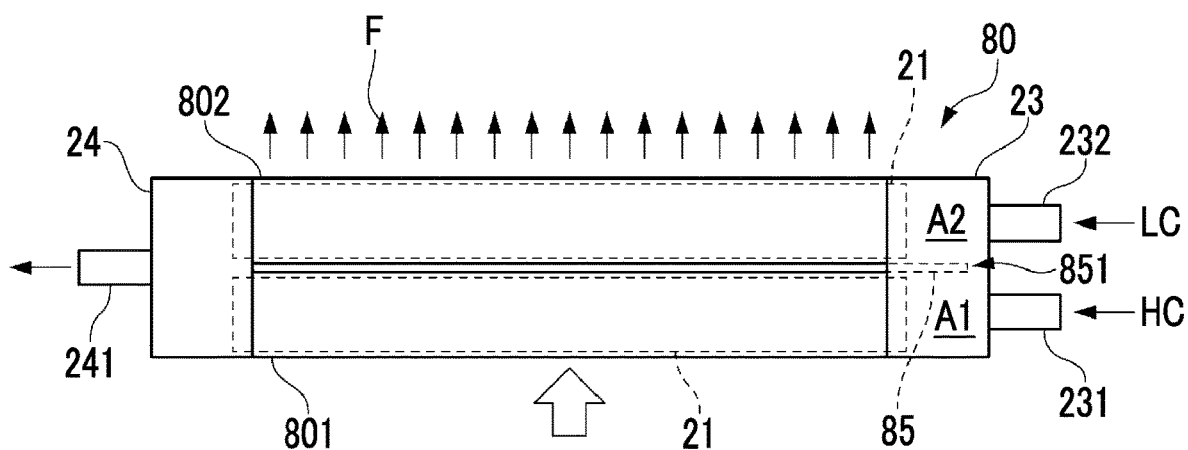

As shown in FIGS. 7A and 7B, the heat exchanger 80 according to the second embodiment includes a plurality of rows (801 and 802) of the tubes 21 arranged in the air flow direction D1, the fins 22 appropriately provided on the tubes 21, an inlet header 23, and the outlet header 24.

Like the heat exchanger 20 of the first embodiment, the heat exchanger 80 can configure, for example, the air conditioner 1 shown in FIG. 4.

A heat exchange core disposed on the upstream side in the air flow direction D1 will be called an upwind row 801, and a heat exchange core disposed on the downstream side in the air flow direction D1 will be called a downwind row 802.

The upwind row 801 is formed by the plurality of tubes 21 stacked in the intersecting direction D2 intersecting the air flow direction D1 and the plurality of fins 22. The same applies to the downwind row 802.

The heat exchanger 20 of the first embodiment described above may be configured to include the upwind row 801 and the downwind row 802.

The number of the tubes 21 in the upwind row 801 and the number of the tubes 21 in the downwind row 802 are the same n, the tubes 21 in the upwind row 801 and the tubes 21 in the downwind row 802 which are at the same stage of the first to nth stages are disposed at the same position in the intersecting direction D2.

However, without being limited to the present embodiment, the number of the tubes 21 may be different between the upwind row 801 and the downwind row 802, and the positions of the tubes 21 in the upwind row 801 and the downwind row 802 which are at the same stage may be shifted from each other in the intersecting direction D2.

The inside of the inlet header 23 communicates with all of the tubes 21 in the upwind row 801 and all of the tubes 21 in the downwind row 802. The same applies also to the inside of the outlet header 24.

The second embodiment has a main feature that the inside of the inlet header 23 is divided into a low-temperature-side section A1 into which a low-temperature-side coolant can flow from the low-temperature-side coolant inflow portion 231 and a high-temperature-side section A2 into which a high-temperature-side coolant can flow from the high-temperature-side coolant inflow portion 232.

In the example shown in FIGS. 7A and 7B, the inside of the inlet header 23 is divided into the low-temperature-side section A1 and the high-temperature-side section A2 by a panel-shaped partition member 85 disposed along the stage direction.

In the second embodiment, the low-temperature-side coolant inflow portion 231 is shifted to the upstream side (upwind side) in the air flow direction D1 with respect to the high-temperature-side coolant inflow portion 232 as in the first embodiment. For this reason, the low-temperature-side section A1 into which a low-temperature-side coolant can flow is positioned on the upstream side (upwind side) in the air flow direction D1 inside the inlet header 23, and the high-temperature-side section A2 into which a high-temperature-side coolant can flow is positioned on the downstream side (downwind side) in the air flow direction D1 inside the inlet header 23.

For this reason, the low-temperature-side section A1 communicates with the tubes 21 in the upwind row 801, and the high-temperature-side section A2 communicates with the tubes 21 in the downwind row 802.

As shown in FIGS. 7A and 7B, in a state where a movement of a coolant between the low-temperature-side section A1 and the high-temperature-side section A2 through a gap 851 is allowed, the inside of the inlet header 23 is divided into the low-temperature-side section A1 and the high-temperature-side section A2. That is, the inside of the inlet header 23 is not completely partitioned.

For this reason, the partition member 85 is disposed inside the inlet header 23 with the gap 851 between an end edge thereof and an inner wall of the inlet header 23.

Figure 8:
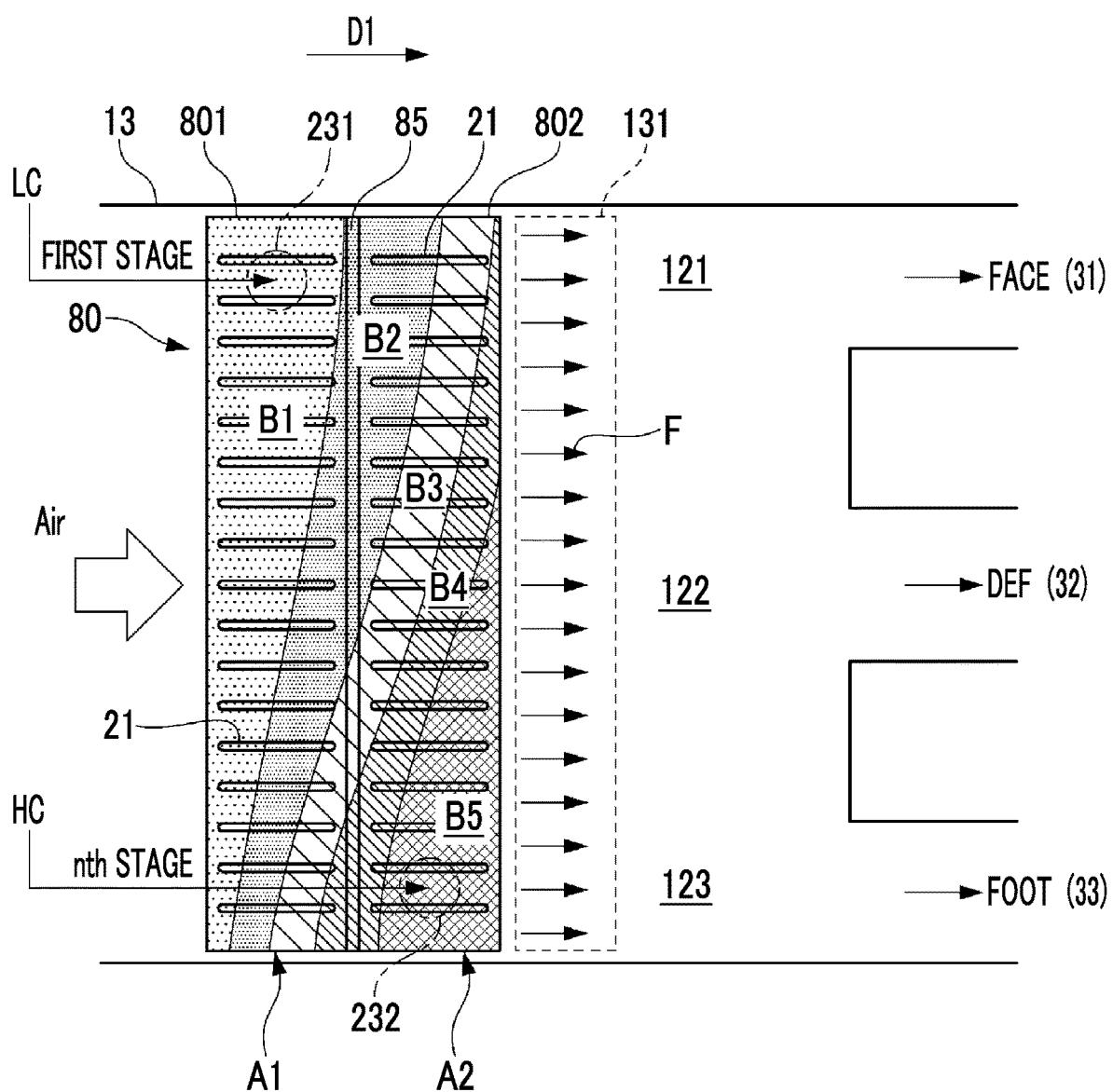
FIG. 8 is a view that schematically shows correspondence between flow of the air flowing out from the air conditioning unit which has passed through the heat exchanger of the second embodiment and the air blowing port in the vehicle interior.

FIG. 8 schematically shows a temperature gradient of a coolant flowing in each of the tubes 21 of the heat exchanger 80 of the second embodiment.

The coolant LC which has flowed from the low-temperature-side coolant inflow portion 231 into the low-temperature-side section A1 mainly flows into the tubes 21 disposed particularly on the first stage side of the upwind row 801.

On the other hand, the coolant HC which has flowed from the high-temperature-side coolant inflow portion 232 into the high-temperature-side section A2 mainly flows into the tubes 21 disposed particularly on the nth stage side of the downwind row 802.

In the second embodiment, a temperature difference between the upwind side and the downwind side is emphasized in a temperature gradient given to the coolant flowing in each of the tubes 21.

Therefore, in the second embodiment, in addition to the effects described in the first embodiment, a capacity of dehumidifying air in the vehicle interior can be improved and fogging of a window can be sufficiently prevented since a low-temperature-side coolant is easily distributed to the tubes 21 on the upwind side.

Even in a case where a coolant is supplied only to the low-temperature-side section A1 as in the pure cooling mode or the coolant is supplied only to the high-temperature-side section A2 as in the pure heating mode by allowing the movement of the coolant between the low-temperature-side section A1 and the high-temperature-side section A2, the coolant flows into both of the low-temperature-side section A1 and high-temperature-side section A2, and the coolant flows also to any one of the tubes 21 in the upwind row 801 and the downwind row 802 through the gap 851. For this reason, all of the tubes 21 included in the heat exchanger 80 can contribute to heat exchange.

The configuration for dividing into the low-temperature-side section A1 and the high-temperature-side section A2 while allowing the movement of a coolant is not limited to the present embodiment. For example, instead of providing the gap 851 between the end edge of the partition member 85 and an inner wall of the inlet header 23, the partition member may have a hole through which the coolant can enter and exit.

Alternatively, the inlet header 23 is formed by two separate tubular bodies, and the tubular bodies may be configured to communicate with each other via a passage through which the coolant passes.

The heat exchanger 80 may include the tubes 21 arranged in three or more rows. In this case, for example, the tubes 21 in a first row positioned on the upwind side communicate with the low-temperature-side section A1, and the remaining tubes 21 in a second row and a third row communicate with the high-temperature-side section A2.

In addition to the description above, it is possible to select a configuration described in the embodiments or to appropriately change other configurations without departing from the gist of the present invention.

The heat exchanger, the air conditioning unit, and the air conditioner of the present invention are not limited for use in vehicles, and can also be applied to air conditioning of buildings.

Although the air conditioning unit 10 includes the three air outflow portions 121 to 123 in the embodiments, the air conditioning unit of the present invention may include only two air outflow portions.

In this case, for example, the two air outflow portions may correspond to the blowing port for a face and the blowing port for a window, may correspond to the blowing port for a window and the blowing port for feet, or may correspond to the blowing port for a face and the blowing port for feet.

In addition, there may be a blowing port in addition to the blowing port for a face, the blowing port for a window, and the blowing port for feet, and in this case, the air conditioning unit of the present invention may include four or more air outflow portions.

REFERENCE SIGNS LIST

1: air conditioner
10: air conditioning unit
11: blower
11A: suction portion
11B: discharge portion
12: air outflow portion
13: duct
13A: trailing end
20: heat exchanger (first heat exchanger)
20A: air supply surface
20C: heat exchange core
21: tube 21A: upstream end portion
21B: downstream end portion
22: fin
23: inlet header
24: outlet header
251, 252, 26, 27, 28: connection pipe
31 to 33: blowing port (air blowing port)
40: refrigerant circuit
41: compressor
43: condenser
45: liquid receiver
47: expansion valve (decompression unit)
49: evaporator
50: high-temperature-side coolant circuit
51: high-temperature-side heat exchanger
53: high-temperature-side circulation pump
60: low-temperature-side coolant circuit
61: low-temperature-side heat exchanger
63: low-temperature-side circulation pump
67, 68: exhaust heat collector
70: controller
80: heat exchanger
23: inlet header
85: partition member
91: evaporator
92: heater core
93: air mix damper
94: mixing region
121: low-temperature-side air outflow portion
122: medium temperature air outflow portion
123: high-temperature-side air outflow portion
131: region
231: low-temperature-side coolant inflow portion
232: high-temperature-side coolant inflow portion
241: coolant outflow portion
801: upwind row
802: downwind row
851: gap
A1: low-temperature-side section
A2: high-temperature-side section
B1, B2, B3, B4, B5: temperature range
CL: coolant circuit
CL1: vehicle exterior heat exchanger (second heat exchanger)
CL2: fan
C3, C5: confluence point
D1: air flow direction (direction of flow of air)
D2: intersecting direction
D3: coolant flow direction (direction in which coolant flows)
In: vehicle interior
Out: vehicle exterior
LC: low-temperature-side coolant
HC: high-temperature-side coolant
LH1 to LH6: pipe
LL1 to LL6: pipe
SV1: first electromagnetic valve
SV2: second electromagnetic valve
V1: first regulating valve
V2: second regulating valve
V3: third regulating valve

The invention claimed is:

1. An air conditioning unit comprising:
a heat exchanger that causes air and a coolant to exchange heat with each other;
a blower that supplies the air to the heat exchanger; and
an air outflow port through which the air, which has passed through the heat exchanger, flows out from the air conditioning unit,
wherein the heat exchanger includes
a plurality of stacked tubes each of which allows the coolant to flow therein in a first direction, the tubes being stacked in a second direction intersecting the first direction,
an air supply surface intended to receive from the blower a flow of air that will pass through the heat exchanger,
an inlet header that communicates with end portions of the plurality of tubes on an upstream side in the first direction in which the coolant flows,
an outlet header that communicates with end portions of the plurality of tubes on a downstream side in the first direction in which the coolant flows, and
a fin that is thermally coupled to the plurality of tubes,
the inlet header includes a low-temperature-side coolant inflow port into which the coolant having a relatively low temperature is able to flow and a high-temperature-side coolant inflow port into which the coolant having a relatively high temperature is able to flow, and
the low-temperature-side coolant inflow port and the high-temperature-side coolant inflow port are spaced from each other in a third direction that intersects both second and first directions such that the low-temperature-side coolant inflow port and the high-temperature-side coolant inflow port are at different positions from the air supply surface in the third direction, the low-temperature-side coolant inflow port and the high-temperature-side coolant port being also spaced from each other in the intersecting second direction.

2. The air conditioning unit according to claim 1, wherein the low-temperature-side coolant inflow port is positioned closer to the air supply surface than the high-temperature-side coolant inflow port in the third direction.

3. The air conditioning unit according to claim 2, wherein the air outflow port includes a low-temperature-side air outflow port through which the air having a relatively low temperature flows out and a high-temperature-side air outflow port through which the air having a relatively high temperature flows out.

4. The air conditioning unit according to claim 2, wherein the heat exchanger has a curved shape in which a part is positioned relatively on an upstream side in the third direction and the other part is positioned relatively on a downstream side.

5. The air conditioning unit according to claim 2, wherein the inlet header and the outlet header communicate with a plurality of rows of the tubes arranged in the third direction,
an inside of the inlet header is divided into a low-temperature-side section into which the coolant is able to flow from the low-temperature-side coolant inflow port and a high-temperature-side section into which the coolant is able to flow from the high-temperature-side coolant inflow port,
the low-temperature-side section communicates with the tubes in a row on an upstream side or a downstream side in the third direction,
the high-temperature-side section communicates with the tubes in another row, and
a movement of the coolant between the low-temperature-side section and the high-temperature-side section is allowed.

6. The air conditioning unit according to claim 1,
wherein the air outflow port includes a low-temperature-side air outflow port through which the air having a relatively low temperature flows out and a high-temperature-side air outflow port through which the air having a relatively high temperature flows out.

7. The air conditioning unit according to claim 6,
wherein the air conditioning unit is used in air conditioning of an interior of a vehicle,
the air outflow port includes the low-temperature-side air outflow port, the high-temperature-side air outflow port, and a medium temperature air outflow port through which the air having a relatively medium temperature flows out,
the low-temperature-side air outflow port, the medium temperature air outflow port, and the high-temperature-side air outflow port are spaced from each other in the intersecting second direction,
the low-temperature-side air outflow port corresponds to an air blowing port for a face,
the medium temperature air outflow port corresponds to an air blowing port for a window, and
the high-temperature-side air outflow port corresponds to an air blowing port for feet.

8. The air conditioning unit according to claim 7,
wherein the heat exchanger has a curved shape in which a part is positioned relatively on an upstream side in the third direction and the other part is positioned relatively on a downstream side.

9. The air conditioning unit according to claim 7,
wherein the inlet header and the outlet header communicate with a plurality of rows of the tubes arranged in the third direction,
an inside of the inlet header is divided into a low-temperature-side section into which the coolant is able to flow from the low-temperature-side coolant inflow port and a high-temperature-side section into which the coolant is able to flow from the high-temperature-side coolant inflow port,
the low-temperature-side section communicates with the tubes in a row on an upstream side or a downstream side in the third direction,
the high-temperature-side section communicates with the tubes in another row, and
a movement of the coolant between the low-temperature-side section and the high-temperature-side section is allowed.

10. The air conditioning unit according to claim 6,
wherein the heat exchanger has a curved shape in which a part is positioned relatively on an upstream side in the third direction and the other part is positioned relatively on a downstream side.

11. The air conditioning unit according to claim 6,
wherein the inlet header and the outlet header communicate with a plurality of rows of the tubes arranged in the third direction,
an inside of the inlet header is divided into a low-temperature-side section into which the coolant is able to flow from the low-temperature-side coolant inflow port and a high-temperature-side section into which the coolant is able to flow from the high-temperature-side coolant inflow port,
the low-temperature-side section communicates with the tubes in a row on an upstream side or a downstream side in the third direction,
the high-temperature-side section communicates with the tubes in another row, and
a movement of the coolant between the low-temperature-side section and the high-temperature-side section is allowed.

12. The air conditioning unit according to claim 1,
wherein the heat exchanger has a curved shape in which a part is positioned relatively on an upstream side in the third direction and the other part is positioned relatively on a downstream side.

13. The air conditioning unit according to claim 12,
wherein the inlet header and the outlet header communicate with a plurality of rows of the tubes arranged in the third direction,
an inside of the inlet header is divided into a low-temperature-side section into which the coolant is able to flow from the low-temperature-side coolant inflow port and a high-temperature-side section into which the coolant is able to flow from the high-temperature-side coolant inflow port,
the low-temperature-side section communicates with the tubes in a row on an upstream side or a downstream side in the third direction,
the high-temperature-side section communicates with the tubes in another row, and
a movement of the coolant between the low-temperature-side section and the high-temperature-side section is allowed.

14. The air conditioning unit according to claim 1,
wherein the inlet header and the outlet header communicate with a plurality of rows of the tubes arranged in the third direction,
an inside of the inlet header is divided into a low-temperature-side section into which the coolant is able to flow from the low-temperature-side coolant inflow port and a high-temperature-side section into which the coolant is able to flow from the high-temperature-side coolant inflow port,
the low-temperature-side section communicates with the tubes in a row on an upstream side or a downstream side in the third direction,
the high-temperature-side section communicates with the tubes in another row, and
a movement of the coolant between the low-temperature-side section and the high-temperature-side section is allowed.

15. A heat exchanger that causes air and a coolant to exchange heat with each other, the heat exchanger comprising:
a plurality of stacked tubes each of which allows the coolant to flow therein in a first direction, the tubes being stacked in a second direction intersecting the first direction;
an air supply surface intended to receive a flow of air that will be supplied to the heat exchanger and will pass through the heat exchanger,
an inlet header that communicates with end portions of the plurality of tubes on an upstream side in the first direction in which the coolant flows;
an outlet header that communicates with end portions of the plurality of tubes on a downstream side in the first direction in which the coolant flows; and
a fin that is thermally coupled to the plurality of tubes,
wherein the inlet header includes a low-temperature-side coolant inflow port into which the coolant having a relatively low temperature flows and a high-temperature-side coolant inflow port into which the coolant having a relatively high temperature flows, and the low-temperature-side coolant inflow port and the high-temperature-side coolant inflow port are spaced from each other in a third direction of flow that intersects both second and first directions such that the low-temperature-side coolant inflow port and the high-temperature-side coolant inflow port are at different positions from the air supply surface in the third direction, the low-temperature-side coolant inflow port and the high-temperature-side coolant inflow port being also spaced from each other in the intersecting second direction.

16. An air conditioner comprising:
a refrigerant circuit that includes a compressor, a condenser, an expansion valve, and an evaporator;
a high-temperature-side coolant circuit that includes a high-temperature-side heat exchanger which causes a coolant and a refrigerant flowing in the condenser to exchange heat with each other;
a low-temperature-side coolant circuit that includes a low-temperature-side heat exchanger which causes the coolant and a refrigerant flowing in the evaporator to exchange heat with each other;
a first heat exchanger to which the coolant is supplied from at least one of the high-temperature-side coolant circuit and the low-temperature-side coolant circuit; and
a second heat exchanger to which the coolant is supplied from at least one of the high-temperature-side coolant circuit and the low-temperature-side coolant circuit,
wherein the first heat exchanger is the heat exchanger of the air conditioning unit according to claim 1,
the coolant is able to flow from the low-temperature-side coolant circuit into the low-temperature-side coolant inflow port, and
the coolant is able to flow from the high-temperature-side coolant circuit into the high-temperature-side coolant inflow port.

17. The air conditioner according to claim 16,
wherein the air conditioner is used in air conditioning of an interior of a vehicle, and
the air outflow port of the air conditioning unit corresponds to a blowing port through which the air is blown to the interior.

18. An air conditioner comprising:
a refrigerant circuit that includes a compressor, a condenser, an expansion valve, and an evaporator;
a high-temperature-side coolant circuit that includes a high-temperature-side heat exchanger which causes a coolant and a refrigerant flowing in the condenser to exchange heat with each other;
a low-temperature-side coolant circuit that includes a low-temperature-side heat exchanger which causes the coolant and a refrigerant flowing in the evaporator to exchange heat with each other;
a first heat exchanger to which the coolant is supplied from at least one of the high-temperature-side coolant circuit and the low-temperature-side coolant circuit; and
a second heat exchanger to which the coolant is supplied from at least one of the high-temperature-side coolant circuit and the low-temperature-side coolant circuit,
wherein the first heat exchanger is the heat exchanger of the air conditioning unit according to claim 2,
the coolant is able to flow from the low-temperature-side coolant circuit into the low-temperature-side coolant inflow port, and
the coolant is able to flow from the high-temperature-side coolant circuit into the high-temperature-side coolant inflow port.

19. An air conditioner comprising:
a refrigerant circuit that includes a compressor, a condenser, an expansion valve, and an evaporator;
a high-temperature-side coolant circuit that includes a high-temperature-side heat exchanger which causes a coolant and a refrigerant flowing in the condenser to exchange heat with each other;
a low-temperature-side coolant circuit that includes a low-temperature-side heat exchanger which causes the coolant and a refrigerant flowing in the evaporator to exchange heat with each other;
a first heat exchanger to which the coolant is supplied from at least one of the high-temperature-side coolant circuit and the low-temperature-side coolant circuit; and
a second heat exchanger to which the coolant is supplied from at least one of the high-temperature-side coolant circuit and the low-temperature-side coolant circuit,
wherein the first heat exchanger is the heat exchanger of the air conditioning unit according to claim 6,
the coolant is able to flow from the low-temperature-side coolant circuit into the low-temperature-side coolant inflow port, and
the coolant is able to flow from the high-temperature-side coolant circuit into the high-temperature-side coolant inflow port.

20. An air conditioner comprising:
a refrigerant circuit that includes a compressor, a condenser, an expansion valve, and an evaporator;
a high-temperature-side coolant circuit that includes a high-temperature-side heat exchanger which causes a coolant and a refrigerant flowing in the condenser to exchange heat with each other;
a low-temperature-side coolant circuit that includes a low-temperature-side heat exchanger which causes the coolant and a refrigerant flowing in the evaporator to exchange heat with each other;
a first heat exchanger to which the coolant is supplied from at least one of the high-temperature-side coolant circuit and the low-temperature-side coolant circuit; and
a second heat exchanger to which the coolant is supplied from at least one of the high-temperature-side coolant circuit and the low-temperature-side coolant circuit,
wherein the first heat exchanger is the heat exchanger of the air conditioning unit according to claim 7,
the coolant is able to flow from the low-temperature-side coolant circuit into the low-temperature-side coolant inflow port, and
the coolant is able to flow from the high-temperature-side coolant circuit into the high-temperature-side coolant inflow port.

* * * * *